United States Patent
Hendry et al.

(10) Patent No.: US 9,769,492 B2
(45) Date of Patent: Sep. 19, 2017

(54) CONFORMANCE PARAMETERS FOR BITSTREAM PARTITIONS

(71) Applicant: QUALCOMM Incorporated, San Diego, CA (US)

(72) Inventors: Fnu Hendry, Poway, CA (US); Ye-Kui Wang, San Diego, CA (US); Adarsh Krishnan Ramasubramonian, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 261 days.

(21) Appl. No.: 14/730,041

(22) Filed: Jun. 3, 2015

(65) Prior Publication Data
US 2015/0358640 A1    Dec. 10, 2015

Related U.S. Application Data

(60) Provisional application No. 62/009,112, filed on Jun. 6, 2014.

(51) Int. Cl.
*H04N 19/547*    (2014.01)
*H04N 19/61*    (2014.01)
(Continued)

(52) U.S. Cl.
CPC ........... *H04N 19/547* (2014.11); *H04N 19/30* (2014.11); *H04N 19/44* (2014.11); *H04N 19/463* (2014.11); *H04N 19/61* (2014.11); *H04N 19/70* (2014.11)

(58) Field of Classification Search
CPC ...... H04N 19/30; H04N 19/44; H04N 19/463; H04N 19/547; H04N 19/61; H04N 19/70
(Continued)

(56) References Cited

U.S. PATENT DOCUMENTS

| 2015/0189322 A1* | 7/2015 | He | H04N 19/597 |
| | | | 375/240.16 |
| 2015/0264404 A1* | 9/2015 | Hannuksela | H04N 19/70 |
| | | | 375/240.16 |

(Continued)

FOREIGN PATENT DOCUMENTS

| KR | WO 2015053593 A1 * | 4/2015 | ............. H04N 19/29 |

OTHER PUBLICATIONS

International Search Report and Written Opinion—PCT/US2015/034253—ISA/EPO—Aug. 7, 2016.*

(Continued)

*Primary Examiner* — Francis G Geroleo
(74) *Attorney, Agent, or Firm* — Knobbe, Martens, Olson & Bear, LLP

(57) ABSTRACT

Video data bitstreams may contain bitstream conformance parameters, such as hypothetical reference decoder (HRD) parameters, which may be used to allow a decoder to test the conformance of a received bitstream. In multi-layer codecs transmitted using partitions, the video data may be associated with one or more layer sets. Each layer set may be associated with one or more output layer sets. Each output layer set may be further associated with one or more partitioning schemes. Conformance parameters are mapped to partitions of a partitioning scheme, based upon the output layer set that the partitioning scheme is associated with. This allows for a partition to be associated with different conformance parameters, depending upon the output layer set that is being used.

29 Claims, 13 Drawing Sheets

(51) Int. Cl.
*H04N 19/44* (2014.01)
*H04N 19/70* (2014.01)
*H04N 19/30* (2014.01)
*H04N 19/463* (2014.01)

(58) Field of Classification Search
USPC .................................................. 375/240.13
See application file for complete search history.

(56) References Cited

U.S. PATENT DOCUMENTS

| | | | | |
|---|---|---|---|---|
| 2015/0341649 | A1* | 11/2015 | Narasimhan | H04N 19/34 375/240.12 |
| 2016/0227233 | A1* | 8/2016 | Cho | H04N 19/70 |
| 2016/0227248 | A1* | 8/2016 | Choi | H04N 19/29 |

OTHER PUBLICATIONS

Chen Y., et al., "MV-HEVC/SHVC HLS: On Multi-Mode Bitstream Extraction", No. JCTVC-O0273, Oct. 15, 2013 (Oct. 15, 2013), XP030115341.

Ramasubramonian et al., "MV-HEVC Specification Text (annex to JOTVC-R0043_v3)", May 23, 2014 (May 23, 2014), XP055264643.

Chen Y., et al., "MV-HEVC/SHVC HLS: On multi-mode bitstream extraction", 6. JCT-3V Meeting; Oct. 25, 2013-Jan. 11, 2013; Geneva; (The Joint Collaborative Team on 3D Video Coding Extension Development of ISO/IEC JTC1/SC29/WG11 and ITU-TSG.16 ); URL: http://phenix.int-evry.ft/jct2/,, No. JCT3V-F0091, XP030131502, Oct. 15, 2013 (Oct. 15, 2013), 9 pages.

International Search Report and Written Opinion—PCT/US2015/034253—ISA/EPO—Aug. 11, 2015.

Ramasubramonian A K., et al., "SHVC/MV-HEVC level definitions and related decoder capability requirements", 18. JCT-VC Meeting; Jun. 30, 2014-Sep. 7, 2014; Sapporo; (Joint Collaborative Team on Video Coding of ISO/IEC JTC1/SC29/WG11 and ITU-T SG.16 ); URL: http://wftp3.itu.int/AV-ARCH/JCTVC-SITE/,, No. JCTVC-R0043-v9, Jul. 8, 2014, XP030116282, 9 Pages.

Ramasubramonian A K., et al., "SHVC/MV-HEVC level definitions and related decoder capability requirements", 18. JCT-VC Meeting; Jun. 30, 2014-Sep. 7, 2014; Sapporo; (Joint Collaborative Team on Video Coding of ISO/IEC JTC1/SC29/WG11 and ITU-T SG.16 ); URL: http://wftp3.itu.int/av-arch/jcivc-site/,, No. JCTVC-R0043, May 1, 2014 (May 1, 2014), 2 pages; XP030116281.

Tech G., et al., "MV-HEVC Draft Text 8", 8. JCT-3V Meeting; Mar. 29, 2014-Apr. 4, 2014; Valencia; (The Joint Collaborative Team on 3D Video Coding Extension Development of ISO/IEC JTC1/SC29/WG11 and ITU-T SG.16 ); URL: http://phenix.int-evry.fr/jct3v/ ,, No. JCT3V-H1002-v5, Jun. 3, 2014, XP030132292, 163 pages.

\* cited by examiner

CONFORMANCE PARAMETERS FOR BITSTREAM PARTITIONS

INCORPORATION BY REFERENCE TO PRIORITY APPLICATION(S)

This application claims the priority and benefit of U.S. Provisional No. 62/009,112, filed Jun. 6, 2014, which is hereby incorporated by reference in its entirety. Any and all applications for which a foreign or domestic priority claim is identified in the Application Data Sheet as filed with the present application are hereby incorporated by reference under 37 CFR 1.57.

TECHNICAL FIELD

This disclosure is related to the field of video coding. More particularly, it is applicable to the specification of bitstream conformance parameters of multi-layer codecs that are operating on bitstream partitions.

BACKGROUND

Digital video capabilities can be incorporated into a wide range of devices, including digital televisions, digital direct broadcast systems, wireless broadcast systems, personal digital assistants (PDAs), laptop or desktop computers, digital cameras, digital recording devices, digital media players, video gaming devices, video game consoles, cellular or satellite radio telephones, video teleconferencing devices, and the like. Digital video devices implement video compression techniques, such as those described in the standards defined by MPEG-2, MPEG-4, ITU-T H.263, ITU-T H.264/MPEG-4, Part 10, Advanced Video Coding (AVC), the High Efficiency Video Coding (HEVC) standard, and extensions of such standards. The video devices may transmit, receive, encode, decode, and/or store digital video information more efficiently by implementing such video coding techniques.

SUMMARY

The systems, methods and devices of this disclosure each have several innovative aspects, no single one of which is solely responsible for the desirable attributes disclosed herein. Without limiting the scope of the appended claims, certain features are described herein.

Details of one or more implementations of the subject matter described in this specification are set forth in the accompanying drawings and the description below. Other features, aspects, and advantages will become apparent from the description, the drawings, and the claims. Note that the relative dimensions of the following figures may not be drawn to scale.

In accordance with one or more aspects of the present disclosure, there is provided a method operable by a video encoder. The method may comprise coding video data to form a bitstream having at least one layer and at least one layer set, associating each layer set with at least one output layer set, wherein an output layer set among the at least one output layer set indicates a subset of its associated layer set that is to be output by a video decoder. The method may further comprise associating at least one partitioning scheme with the output layer set of the at least one output layer set, and mapping a first conformance parameter to a partition of a partitioning scheme among the at least one partitioning scheme, based at least in part on the output layer set. In some embodiments, the at least one conformance parameter may comprise a hypothetical reference decoder (HRD) parameter.

In some embodiments, the method may perform a determination as to whether or not to signal a conformance parameter prior to mapping the first conformance parameter to the partition.

In some embodiments, the method may further comprise signaling a bit in the bitstream to indicate that the output layer set is associated with a default partitioning scheme, if the output layer set is associated with only one partitioning scheme. In some embodiments, the default partitioning scheme corresponds to a partitioning scheme where each layer is separated into its own partition.

In some embodiments, the method may further comprise determining a first index of the output layer set, determining a second index of the partitioning scheme associated with the output layer set, identifying a nesting supplemental enhancement information (SEI) message, the nesting SEI message comprising at least one nested SEI message, and defining an association between the at least one nested SEI message and the partitioning scheme based at least in part on the first and second indices.

In some embodiments, the bitstream may be associated with a base video parameter set (VPS) and a video usability information (VUI) parameter set, and the method may further comprise determining a first portion of at least one conformance parameter that is signaled in the base VPS, identifying a second portion of the at least one conformance parameter signaled in the VUI, and extending the second portion to be accessible via a data structure associated with the base VPS. In some embodiments, mapping the first conformance parameter may comprise mapping the first portion and the second portion of the at least one conformance parameter based on the data structure associated with the base VPS.

In some embodiments, at least one partitioning scheme may be associated with each output layer set of the at least one output layer set.

In some embodiments, the method may further comprise associating the partitioning scheme with a second output layer set of the at least one output layer set, and mapping a second conformance parameter to the partition of the partitioning scheme associated with the second output layer set, based at least in part upon the second output layer set.

Another aspect of the disclosure provides a method for operable by a video decoder. The method may comprise receiving a video data bitstream having at least one layer and at least one layer set, and identifying a layer set among the at least one layer set of the bitstream, the identified layer set indicating a subset of the at least one layer to be decoded. The method may further comprise determining an output layer set associated with the identified layer set, the output layer set indicating a subset of the identified layer set that is to be output by the video decoder and determining a partitioning scheme associated with the output layer set, wherein the bitstream is received as one or more partitions according to the partitioning scheme associated with the output layer set, and wherein at least one conformance parameter is mapped to a partition of the partitioning scheme, based at least in part upon the output layer set associated with the partitioning scheme. In some embodiments, the at least one conformance parameter may comprise a hypothetical reference decoder (HRD) parameter.

In some embodiments, the method may further comprise checking a bit received in the bitstream, in order to determine if the output layer set is only associated with a default partitioning scheme. In some embodiments, the default partitioning scheme corresponds to a partitioning scheme where each layer is separated into its own partition.

In some embodiments, the method may further comprise identifying an index associated with the output layer set, identifying an index associated with the partitioning scheme associated with the output layer set, identifying a nesting supplemental enhancement information (SEI) message, the nesting SEI message comprising one or more contained SEI messages, and identifying an association between the nesting SEI message and its contained SEI messages with the partitioning scheme using the identified partitioning scheme index and identified output layer set index.

In some embodiments, the bitstream may be associated with a VPS and a VUI, and the method may further comprise identifying a first portion of the one or more conformance parameters signaled in the base VPS, and identifying a second portion of the one or more conformance parameters signaled the VUI, wherein the second portion of conformance parameters are extended such that they are accessible through a data structure associated with the base VPS. In some embodiments, the one or more conformance parameters mapped to the partition may comprise the first portion of conformance parameters and the second portion of conformance parameters accessed through the data structure associated with the base VPS.

Another aspect of the disclosure provides a video encoder. The video encoder may comprise a memory configured to store video data, and a processor in communication with the memory. In some embodiments, the processor is configured to code the video data to form a bitstream having at least one layer and at least one layer set, associate at least one output layer set with each layer set, wherein an output layer set among the at least one output layer set indicating a subset of its associated layer set that is to be output by a video decoder. The processor may be further configured to associate at least one partitioning scheme with the output layer set of the at least one output layer set, and map at least one conformance parameter to a partitioning scheme among the at least one partitioning scheme based, at least in part on the output layer set. In some embodiments, the at least one conformance parameter comprises a hypothetical reference decoder (HRD) parameter. In some embodiments, the processor may be configured to perform a determination as to whether or not to signal a conformance parameter, prior to mapping the at least one conformance parameter to the partition.

In some embodiments, the processor may be further configured to, in response to the output layer set being associated with only one partitioning scheme, signal a bit in the bitstream to indicate that the output layer set is associated with a default partitioning scheme. In some embodiments, the default partitioning scheme may corresponding to a partitioning scheme separating each layer of at least one layer into its own partition.

In some embodiments, the processor may be further configured to determine a first index of the output layer set, determine a second index of the partitioning scheme associated with the output layer set, identify a nesting supplemental enhancement information (SEI) message, the nesting SEI message comprising at least one nested SEI message, and define an association between the at least one nested SEI message and the partitioning scheme based at least in part on the first and second indices.

In some embodiments, the bitstream may be associated with a VPS and a VUI parameter set, and the processor may be further configured to determine a first portion of the at least one conformance parameter that is signaled in the base VPS, identify a second portion of at least one conformance parameter signaled in the VUI, and extend the second portion to be accessible via a data structure associated with the base VPS. In some embodiments, mapping the at least one conformance parameter may comprise mapping the first portion and the second portion based on the data structure associated with the base VPS.

Another aspect of the disclosure provides a video decoder. The video decoder may comprise a memory configured to store decoded video data and a processor in communication with the memory. The processor may be configured to decode a received a video data bitstream to form the decoded video data, the received video data bitstream having at least one layer and at least one layer set, wherein the decoding comprises identifying a layer set among the at least one layer set of the bitstream, the identified layer set indicating a subset of the at least one layer to be decoded, determining an output layer set associated with the identified layer set, the output layer set indicating a subset of the identified layer set that is to be output by the video decoder, and determining a partitioning scheme associated with the output layer set, wherein the bitstream is received as one or more partitions according to the partitioning scheme associated with the output layer set, and wherein at least one conformance parameter is mapped to a partition of the partitioning scheme based at least in part upon the output layer set associated with the partitioning scheme. In some embodiments, the at least one conformance parameter comprises a hypothetical reference decoder (HRD) parameter.

In some embodiments, the processor may be further configured to check a bit received in the bitstream, in order to determine if the output layer set is only associated with a default partitioning scheme. In some embodiments, the default partitioning scheme corresponds to a partitioning scheme where each layer is separated into its own partition.

In some embodiments, the processor may be further configured to identify an index associated with the output layer set, identify an index associated with the partitioning scheme associated with the output layer set, identifying a nesting supplemental enhancement information (SEI) message, the nesting SEI message comprising one or more contained SEI messages, and identify an association between the nesting SEI message and its contained SEI messages with the partitioning scheme using the identified partitioning scheme index and identified output layer set index.

In some embodiments, the bitstream may be associated with a VPS and a VUI, and the processor may be further configured to identify a first portion of the one or more conformance parameters signaled in the base VPS, and identify a second portion of the one or more conformance parameters signaled the VUI, wherein the second portion of conformance parameters are extended such that they are accessible through a data structure associated with the base VPS. In some embodiments, the one or more conformance parameters mapped to the partition may comprise the first portion of conformance parameters and the second portion of conformance parameters accessed through the data structure associated with the base VPS.

DETAILED DESCRIPTION

Figure 1A:
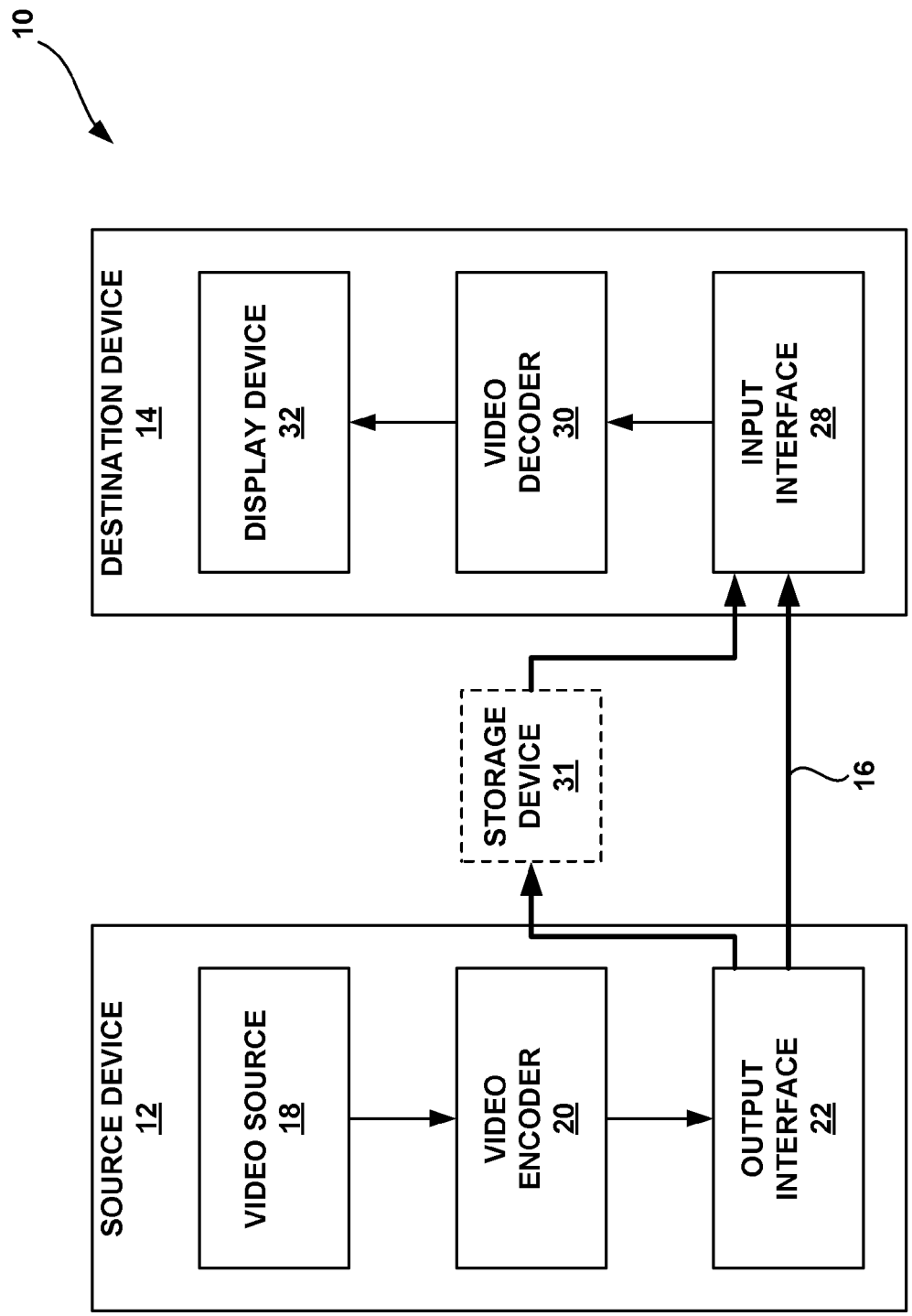
FIG. 1A is a block diagram illustrating an example video encoding and decoding system that may utilize techniques in accordance with aspects described in this disclosure.

In general, this disclosure relates to specifying conformance parameters in the context of advanced video codecs, such as High Efficiency Video Coding (HEVC). More specifically, the present disclosure relates to systems and methods for improved specification and mapping of bitstream conformance parameters in scalable video coding extension of HEVC referred to as SHVC.

Scalable video coding refers to video coding in which a base layer (BL), sometimes referred to as a reference layer (RL), and one or more scalable enhancement layers (ELs) are used. In scalable video coding, the BL can carry video data with a base level of quality. The one or more ELs can carry additional video data to support, for example, higher spatial, temporal, and/or signal-to-noise ratio (SNR) levels. ELs may be defined relative to a previously encoded layer. For example, a bottom layer may serve as a BL, while a top layer may serve as an EL. Middle layers may serve as either ELs or RLs, or both. For example, a middle layer (e.g., a layer that is neither the lowest layer nor the highest layer) may be an EL for the layers below the middle layer, such as the BL or any intervening ELs, and at the same time serve as an RL for one or more ELs above the middle layer. Similarly, in the multiview or 3D extension of the HEVC standard, there may be multiple views, and information of one view may be utilized to code (e.g., encode or decode) the information of another view (e.g., motion estimation, motion vector prediction and/or other redundancies).

Bitstream conformance parameters, such as hypothetical reference decoder (HRD) parameters, may be included as part of a video data bitstream, to allow a decoder to test the conformance of a received bitstream. In multi-layer codecs transmitted using partitions, the HRD parameters may be mapped to particular partitions. However, only mapping HRD parameters to partitions does not take into account the output layer set that is being used. Depending upon an output set is being used, a particular partition may need to be associated with different HRD parameters. Thus, an improved method for specifying and mapping bitstream conformance parameters is desired. For purposes of explanation, this disclosure will refer primarily to HRD parameters. However, it is understood that the techniques of this disclosure may also be applicable to other types of conformance parameters.

In the description below, H.264/AVC techniques related to certain embodiments are described; the HEVC standard and related techniques are also discussed. While certain embodiments are described herein in the context of the HEVC and/or H.264 standards, one having ordinary skill in the art may appreciate that systems and methods disclosed herein may be applicable to any suitable video coding standard. For example, embodiments disclosed herein may be applicable to one or more of the following standards (e.g., including standards developed by International Telecommunication Union Telecommunication Standardization Sector [ITU-T] Video Coding Experts Group [VCEG] or International Organization for Standardization/International Electrotechnical Commission [ISO/IEC] Moving Pictures Experts Group [MPEG]): ITU-T H.261, ISO/IEC MPEG-1 Visual, ITU-T H.262 or ISO/IEC MPEG-2 Visual, ITU-T H.263, ISO/IEC MPEG-4 Visual and ITU-T H.264 (also known as ISO/IEC MPEG-4 AVC), including its Scalable Video Coding (SVC) and Multiview Video Coding (MVC) extensions.

HEVC generally follows the framework of previous video coding standards in many respects. The unit of prediction in HEVC is different from the units of prediction (e.g., macroblocks) in certain previous video coding standards. In fact, the concept of macroblock does not exist in HEVC as understood in certain previous video coding standards. A macroblock is replaced by a hierarchical structure based on a quadtree scheme, which may provide high flexibility, among other possible benefits. For example, within the HEVC scheme, three types of blocks, Coding Unit (CU), Prediction Unit (PU), and Transform Unit (TU), are defined. CU may refer to the basic unit of region splitting. CU may be considered analogous to the concept of macroblock, but HEVC does not restrict the maximum size of CUs and may allow recursive splitting into four equal size CUs to improve the content adaptivity. PU may be considered the basic unit of inter/intra prediction, and a single PU may contain multiple arbitrary shape partitions to effectively code irregular image patterns. TU may be considered the basic unit of transform. TU can be defined independently from the PU; however, the size of a TU may be limited to the size of the CU to which the TU belongs. This separation of the block structure into three different concepts may allow each unit to be optimized according to the respective role of the unit, which may result in improved coding efficiency.

For purposes of illustration only, certain embodiments disclosed herein are described with examples including only two layers (e.g., a lower layer such as a BL, and a higher layer such as an EL) of video data. A "layer" of video data may generally refer to a sequence of pictures having at least one common characteristic, such as a view, a frame rate, a resolution, or the like. For example, a layer may include video data associated with a particular view (e.g., perspective) of multiview video data. As another example, a layer may include video data associated with a particular layer of scalable video data. Thus, this disclosure may interchangeably refer to a layer and a view of video data. For example, a view of video data may be referred to as a layer of video data, and a layer of video data may be referred to as a view of video data. In addition, a multi-layer codec (also referred to as a multi-layer video coder or multi-layer encoder-decoder) may jointly refer to a multiview codec or a scalable codec (e.g., a codec configured to encode and/or decode video data using MV-HEVC, 3D-HEVC, SHVC, or another multi-layer coding technique). Video encoding and video decoding may both generally be referred to as video coding. It should be understood that such examples may be applicable to configurations including multiple BLs, RLs, and/or ELs. In addition, for ease of explanation, the following disclosure includes the terms "frames" or "blocks" with reference to certain embodiments. However, these terms are not meant to be limiting. For example, the techniques described below can be used with any suitable video units, such as blocks (e.g., CU, PU, TU, macroblocks, etc.), slices, frames, etc.

Video Coding Standards

A digital image, such as a video image, a TV image, a still image or an image generated by a video recorder or a computer, may consist of pixels or samples arranged in horizontal and vertical lines. The number of pixels in a single image is typically in the tens of thousands. Each pixel typically contains luminance and chrominance information. Without compression, the sheer quantity of information to be conveyed from an image encoder to an image decoder would render real-time image transmission impossible. To reduce the amount of information to be transmitted, a number of different compression methods, such as JPEG, MPEG and H.263 standards, have been developed.

Video coding standards include ITU-T H.261, ISO/IEC MPEG-1 Visual, ITU-T H.262 or ISO/IEC MPEG-2 Visual, ITU-T H.263, ISO/IEC MPEG-4 Visual and ITU-T H.264 (also known as ISO/IEC MPEG-4 AVC), including its Scalable Video Coding (SVC) and Multiview Video Coding (MVC) extensions.

In addition, a video coding standard, namely HEVC, is being developed by the Joint Collaboration Team on Video Coding (JCT-VC) of ITU-T VCEG and ISO/IEC MPEG. The full citation for the HEVC Draft 10 is document JCTVC-L1003, Bross et al., "High Efficiency Video Coding (HEVC) Text Specification Draft 10," Joint Collaborative Team on Video Coding (JCT-VC) of ITU-T SG16 WP3 and ISO/IEC JTC1/SC29/WG11, 12th Meeting: Geneva, Switzerland, Jan. 14, 2013 to Jan. 23, 2013. The multiview extension to HEVC, namely MV-HEVC, and the scalable extension to HEVC, named SHVC, are also being developed by the JCT-3V (ITU-T/ISO/IEC Joint Collaborative Team on 3D Video Coding Extension Development) and JCT-VC, respectively.

Video Coding System

Various aspects of the novel systems, apparatuses, and methods are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the novel systems, apparatuses, and methods disclosed herein, whether implemented independently of, or combined with, any other aspect of the present disclosure. For example, an apparatus may be implemented or a method may be practiced using any number of the aspects set forth herein. In addition, the scope of the present disclosure is intended to cover such an apparatus or method which is practiced using other structure, functionality, or structure and functionality in addition to or other than the various aspects of the present disclosure set forth herein. It should be understood that any aspect disclosed herein may be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

The attached drawings illustrate examples. Elements indicated by reference numbers in the attached drawings correspond to elements indicated by like reference numbers in the following description. In this disclosure, elements having names that start with ordinal words (e.g., "first," "second," "third," and so on) do not necessarily imply that the elements have a particular order. Rather, such ordinal words are merely used to refer to different elements of a same or similar type.

FIG. 1A is a block diagram that illustrates an example video coding system 10 that may utilize techniques in accordance with aspects described in this disclosure. As used described herein, the term "video coder" refers generically to both video encoders and video decoders. In this disclosure, the terms "video coding" or "coding" may refer generically to video encoding and video decoding. In addition to video encoders and video decoders, the aspects described in the present application may be extended to other related devices such as transcoders (e.g., devices that can decode a bitstream and re-encode another bitstream) and middleboxes (e.g., devices that can modify, transform, and/or otherwise manipulate a bitstream).

Figure 1B:
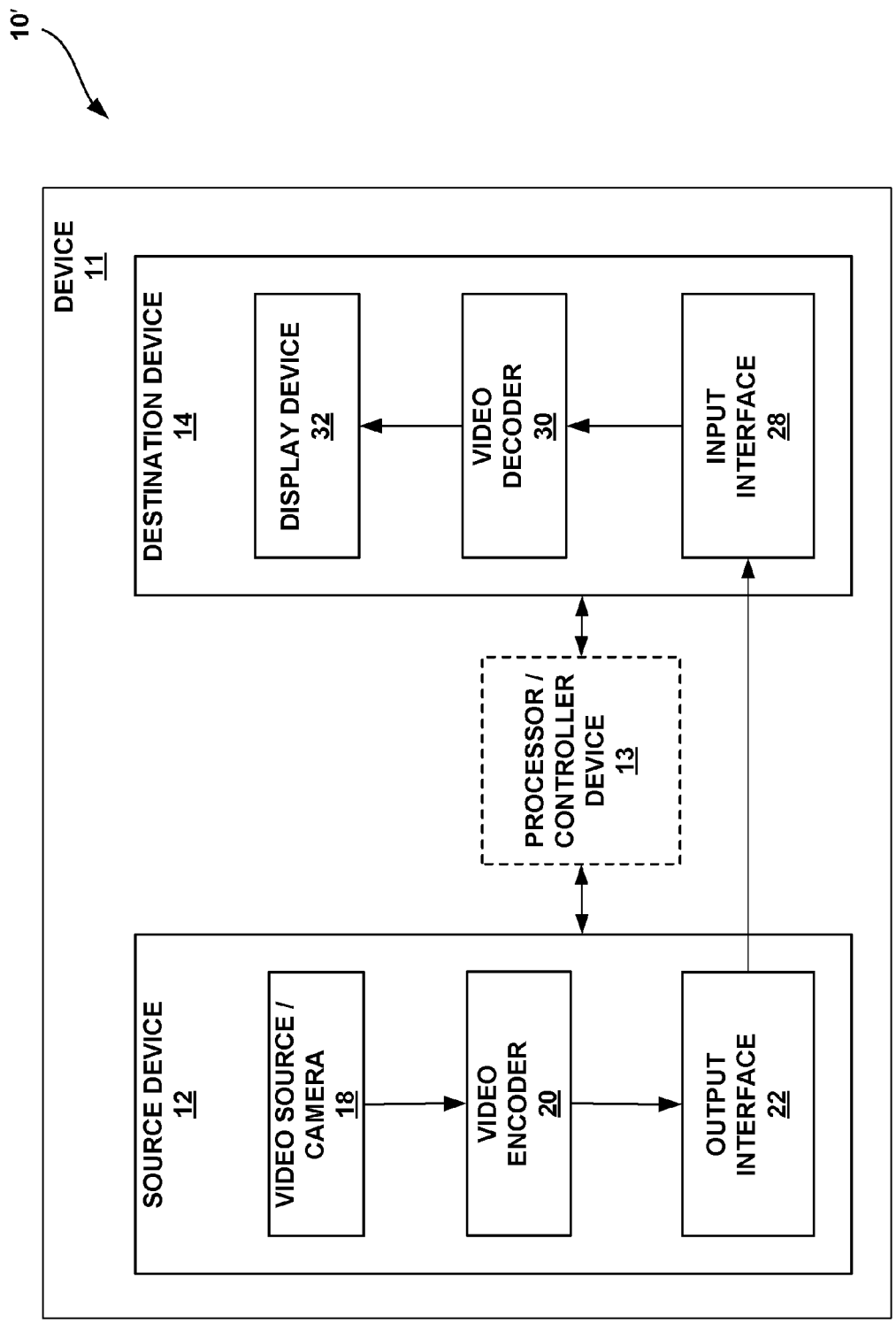
FIG. 1B is a block diagram illustrating another example video encoding and decoding system that may perform techniques in accordance with aspects described in this disclosure.

As shown in FIG. 1A, video coding system 10 includes a source device 12 that generates encoded video data to be decoded at a later time by a destination device 14. In the example of FIG. 1A, the source device 12 and destination device 14 are on separate devices—specifically, the source device 12 is part of a source device, and the destination device 14 is part of a destination device. It is noted, however, that the source and destination devices 12, 14 may be on or part of the same device, as shown in the example of FIG. 1B.

With reference once again, to FIG. 1A, the source device 12 and the destination device 14 may respectively comprise any of a wide range of devices, including desktop computers, notebook (e.g., laptop) computers, tablet computers, set-top boxes, telephone handsets such as so-called "smart" phones, so-called "smart" pads, televisions, cameras, display devices, digital media players, video gaming consoles, video streaming device, or the like. In various embodiments, the source device 12 and the destination device 14 may be equipped for wireless communication.

The destination device 14 may receive, via a link 16, the encoded video data to be decoded. The link 16 may comprise any type of medium or device capable of moving the encoded video data from the source device 12 to the destination device 14. In the example of FIG. 1A, the link 16 may comprise a communication medium to enable the source device 12 to transmit encoded video data directly to the destination device 14 in real-time. The encoded video data may be modulated according to a communication standard, such as a wireless communication protocol, and transmitted to the destination device 14. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from the source device 12 to the destination device 14.

Alternatively, encoded data may be output from an output interface 22 to an optional storage device 31. Similarly, encoded data may be accessed from the storage device 31 by an input interface 28, for example, of the destination device 14. The storage device 31 may include any of a variety of distributed or locally accessed data storage media such as a hard drive, flash memory, volatile or non-volatile memory, or any other suitable digital storage media for storing encoded video data. In a further example, the storage device 31 may correspond to a file server or another intermediate storage device that may hold the encoded video generated by the source device 12. The destination device 14 may access stored video data from the storage device 31 via streaming or download. The file server may be any type of server capable of storing encoded video data and transmitting that encoded video data to the destination device 14. Example file servers include a web server (e.g., for a website), a File Transfer Protocol (FTP) server, network attached storage (NAS) devices, or a local disk drive. The destination device 14 may access the encoded video data through any standard data connection, including an Internet connection. This may include a wireless channel (e.g., a wireless local area network [WLAN] connection), a wired connection (e.g., a digital subscriber line (DSL), a cable modem, etc.), or a combination of both that is suitable for accessing encoded video data stored on a file server. The transmission of encoded video data from the storage device 31 may be a streaming transmission, a download transmission, or a combination of both.

The techniques of this disclosure are not limited to wireless applications or settings. The techniques may be applied to video coding in support of any of a variety of multimedia applications, such as over-the-air television broadcasts, cable television transmissions, satellite television transmissions, streaming video transmissions, e.g., via the Internet (e.g., dynamic adaptive streaming over Hypertext Transfer Protocol (HTTP), etc.), encoding of digital video for storage on a data storage medium, decoding of digital video stored on a data storage medium, or other applications. In some examples, video coding system 10 may be configured to support one-way or two-way video transmission to support applications such as video streaming, video playback, video broadcasting, and/or video telephony.

In the example of FIG. 1A, the source device 12 includes a video source 18, a video encoder 20 and the output interface 22. In some cases, the output interface 22 may include a modulator/demodulator (modem) and/or a transmitter. In the source device 12, the video source 18 may include a source such as a video capture device, e.g., a video camera, a video archive containing previously captured video, a video feed interface to receive video from a video content provider, and/or a computer graphics system for generating computer graphics data as the source video, or a combination of such sources. As one example, if the video source 18 is a video camera, the source device 12 and the destination device 14 may form so-called camera phones or video phones, as illustrated in the example of FIG. 1B. However, the techniques described in this disclosure may be applicable to video coding in general, and may be applied to wireless and/or wired applications.

The captured, pre-captured, or computer-generated video may be encoded by video encoder 20. The encoded video data may be transmitted directly to the destination device 14 via the output interface 22 of the source device 12. The encoded video data may also (or alternatively) be stored onto the storage device 31 for later access by the destination device 14 or other devices, for decoding and/or playback. Video encoder 20 illustrated in FIGS. 1A and 1B may comprise video encoder 20 illustrated FIG. 2A, video encoder 23 illustrated in FIG. 2B, or any other video encoder described herein.

In the example of FIG. 1A, the destination device 14 includes the input interface 28, a video decoder 30, and a display device 32. In some cases, the input interface 28 may include a receiver and/or a modem. The input interface 28 of the destination device 14 may receive the encoded video data over the link 16 and/or from the storage device 31. The encoded video data communicated over the link 16, or provided on the storage device 31, may include a variety of syntax elements generated by video encoder 20 for use by a video decoder, such as video decoder 30, in decoding the video data. Such syntax elements may be included with the encoded video data transmitted on a communication medium, stored on a storage medium, or stored on a file server. Video decoder 30 illustrated in FIGS. 1A and 1B may comprise video decoder 30 illustrated FIG. 3A, video decoder 33 illustrated in FIG. 3B, or any other video decoder described herein.

The display device 32 may be integrated with, or external to, the destination device 14. In some examples, the destination device 14 may include an integrated display device and also be configured to interface with an external display device. In other examples, the destination device 14 may be a display device. In general, the display device 32 displays the decoded video data to a user, and may comprise any of a variety of display devices such as a liquid crystal display (LCD), a plasma display, an organic light emitting diode (OLED) display, or another type of display device.

In related aspects, FIG. 1B shows an example video encoding and decoding system 10' wherein the source and destination devices 12, 14 are on or part of a device 11. The device 11 may be a telephone handset, such as a "smart" phone or the like. The device 11 may include an optional processor/controller device 13 in operative communication with the source and destination devices 12, 14. The system 10' of FIG. 1B, and components thereof, are otherwise similar to the system 10 of FIG. 1A, and components thereof.

Video encoder 20 and video decoder 30 may operate according to a video compression standard, such as HEVC standard, and may conform to a HEVC Test Model (HM). Alternatively, video encoder 20 and video decoder 30 may operate according to other proprietary or industry standards, such as the ITU-T H.264 standard, alternatively referred to as MPEG-4, Part 10, AVC, or extensions of such standards. The techniques of this disclosure, however, are not limited to any particular coding standard. Other examples of video compression standards include MPEG-2 and ITU-T H.263.

Although not shown in the examples of FIGS. 1A and 1B, video encoder 20 and video decoder 30 may each be integrated with an audio encoder and decoder, and may include appropriate MUX-DEMUX units, or other hardware and software, to handle encoding of both audio and video in a common data stream or separate data streams. If applicable, in some examples, MUX-DEMUX units may conform to the ITU H.223 multiplexer protocol, or other protocols such as the user datagram protocol (UDP).

Video encoder 20 and video decoder 30 each may be implemented as any of a variety of suitable encoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 20 and video decoder 30 may be included in one or more encoders or decoders, either of which may be integrated as part of a combined encoder/decoder (e.g., codec) in a respective device.

Video Coding Process

As mentioned briefly above, video encoder 20 encodes video data. The video data may comprise one or more pictures. Each of the pictures is a still image forming part of a video. In some instances, a picture may be referred to as a video "frame." When video encoder 20 encodes the video data, video encoder 20 may generate a bitstream. The bitstream may include a sequence of bits that form a coded representation of the video data. The bitstream may include coded pictures and associated data. A coded picture is a coded representation of a picture.

To generate the bitstream, video encoder 20 may perform encoding operations on each picture in the video data. When video encoder 20 performs encoding operations on the pictures, video encoder 20 may generate a series of coded pictures and associated data. The associated data may include video parameter sets (VPSs), sequence parameter sets (SPSs), picture parameter sets (PPSs), adaptation parameter sets (APSs), and other syntax structures. An SPS may contain parameters applicable to zero or more sequences of pictures. A PPS may contain parameters applicable to zero or more pictures. An APS may contain parameters applicable to zero or more pictures. Parameters in an APS may be parameters that are more likely to change than parameters in a PPS.

To generate a coded picture, video encoder 20 may partition a picture into equally-sized video blocks. A video block may be a two-dimensional array of samples. Each of the video blocks is associated with a treeblock. In some instances, a treeblock may be referred to as a largest coding unit (LCU). The treeblocks of HEVC may be broadly analogous to the macroblocks of previous standards, such as H.264/AVC. However, a treeblock is not necessarily limited to a particular size and may include one or more coding units (CUs). Video encoder 20 may use quadtree partitioning to partition the video blocks of treeblocks into video blocks associated with CUs, hence the name "treeblocks."

In some examples, video encoder 20 may partition a picture into a plurality of slices. Each of the slices may include an integer number of CUs. In some instances, a slice comprises an integer number of treeblocks. In other instances, a boundary of a slice may be within a treeblock.

As part of performing an encoding operation on a picture, video encoder 20 may perform encoding operations on each slice of the picture. When video encoder 20 performs an encoding operation on a slice, video encoder 20 may generate encoded data associated with the slice. The encoded data associated with the slice may be referred to as a "coded slice."

To generate a coded slice, video encoder 20 may perform encoding operations on each treeblock in a slice. When video encoder 20 performs an encoding operation on a treeblock, video encoder 20 may generate a coded treeblock. The coded treeblock may comprise data representing an encoded version of the treeblock.

When video encoder 20 generates a coded slice, video encoder 20 may perform encoding operations on (e.g., encode) the treeblocks in the slice according to a raster scan order. For example, video encoder 20 may encode the treeblocks of the slice in an order that proceeds from left to right across a topmost row of treeblocks in the slice, then from left to right across a next lower row of treeblocks, and so on until video encoder 20 has encoded each of the treeblocks in the slice.

As a result of encoding the treeblocks according to the raster scan order, the treeblocks above and to the left of a given treeblock may have been encoded, but treeblocks below and to the right of the given treeblock have not yet been encoded. Consequently, video encoder 20 may be able to access information generated by encoding treeblocks above and to the left of the given treeblock when encoding the given treeblock. However, video encoder 20 may be unable to access information generated by encoding treeblocks below and to the right of the given treeblock when encoding the given treeblock.

To generate a coded treeblock, video encoder 20 may recursively perform quadtree partitioning on the video block of the treeblock to divide the video block into progressively smaller video blocks. Each of the smaller video blocks may be associated with a different CU. For example, video encoder 20 may partition the video block of a treeblock into four equally-sized sub-blocks, partition one or more of the sub-blocks into four equally-sized sub-sub-blocks, and so on. A partitioned CU may be a CU whose video block is partitioned into video blocks associated with other CUs. A non-partitioned CU may be a CU whose video block is not partitioned into video blocks associated with other CUs.

One or more syntax elements in the bitstream may indicate a maximum number of times video encoder 20 may partition the video block of a treeblock. A video block of a CU may be square in shape. The size of the video block of a CU (e.g., the size of the CU) may range from 8×8 pixels up to the size of a video block of a treeblock (e.g., the size of the treeblock) with a maximum of 64×64 pixels or greater.

Video encoder 20 may perform encoding operations on (e.g., encode) each CU of a treeblock according to a z-scan order. In other words, video encoder 20 may encode a top-left CU, a top-right CU, a bottom-left CU, and then a bottom-right CU, in that order. When video encoder 20 performs an encoding operation on a partitioned CU, video encoder 20 may encode CUs associated with sub-blocks of the video block of the partitioned CU according to the z-scan order. In other words, video encoder 20 may encode a CU associated with a top-left sub-block, a CU associated with a top-right sub-block, a CU associated with a bottom-left sub-block, and then a CU associated with a bottom-right sub-block, in that order.

As a result of encoding the CUs of a treeblock according to a z-scan order, the CUs above, above-and-to-the-left, above-and-to-the-right, left, and below-and-to the left of a given CU may have been encoded. CUs below and to the right of the given CU have not yet been encoded. Consequently, video encoder 20 may be able to access information generated by encoding some CUs that neighbor the given CU when encoding the given CU. However, video encoder 20 may be unable to access information generated by encoding other CUs that neighbor the given CU when encoding the given CU.

When video encoder 20 encodes a non-partitioned CU, video encoder 20 may generate one or more prediction units (PUs) for the CU. Each of the PUs of the CU may be associated with a different video block within the video block of the CU. Video encoder 20 may generate a predicted video block for each PU of the CU. The predicted video block of a PU may be a block of samples. Video encoder 20 may use intra prediction or inter prediction to generate the predicted video block for a PU.

When video encoder 20 uses intra prediction to generate the predicted video block of a PU, video encoder 20 may generate the predicted video block of the PU based on decoded samples of the picture associated with the PU. If video encoder 20 uses intra prediction to generate predicted video blocks of the PUs of a CU, the CU is an intra-predicted CU. When video encoder 20 uses inter prediction to generate the predicted video block of the PU, video encoder 20 may generate the predicted video block of the PU based on decoded samples of one or more pictures other than the picture associated with the PU. If video encoder 20 uses inter prediction to generate predicted video blocks of the PUs of a CU, the CU is an inter-predicted CU.

Furthermore, when video encoder 20 uses inter prediction to generate a predicted video block for a PU, video encoder 20 may generate motion information for the PU. The motion information for a PU may indicate one or more reference blocks of the PU. Each reference block of the PU may be a video block within a reference picture. The reference picture may be a picture other than the picture associated with the PU. In some instances, a reference block of a PU may also be referred to as the "reference sample" of the PU. Video encoder 20 may generate the predicted video block for the PU based on the reference blocks of the PU.

After video encoder 20 generates predicted video blocks for one or more PUs of a CU, video encoder 20 may generate residual data for the CU based on the predicted video blocks for the PUs of the CU. The residual data for the CU may indicate differences between samples in the predicted video blocks for the PUs of the CU and the original video block of the CU.

Furthermore, as part of performing an encoding operation on a non-partitioned CU, video encoder 20 may perform recursive quadtree partitioning on the residual data of the CU to partition the residual data of the CU into one or more blocks of residual data (e.g., residual video blocks) associated with transform units (TUs) of the CU. Each TU of a CU may be associated with a different residual video block.

Video encoder 20 may apply one or more transforms to residual video blocks associated with the TUs to generate transform coefficient blocks (e.g., blocks of transform coefficients) associated with the TUs. Conceptually, a transform coefficient block may be a two-dimensional (2D) matrix of transform coefficients.

After generating a transform coefficient block, video encoder 20 may perform a quantization process on the transform coefficient block. Quantization generally refers to a process in which transform coefficients are quantized to possibly reduce the amount of data used to represent the transform coefficients, providing further compression. The quantization process may reduce the bit depth associated with some or all of the transform coefficients. For example, an n-bit transform coefficient may be rounded down to an m-bit transform coefficient during quantization, where n is greater than m.

Video encoder 20 may associate each CU with a quantization parameter (QP) value. The QP value associated with a CU may determine how video encoder 20 quantizes transform coefficient blocks associated with the CU. Video encoder 20 may adjust the degree of quantization applied to the transform coefficient blocks associated with a CU by adjusting the QP value associated with the CU.

After video encoder 20 quantizes a transform coefficient block, video encoder 20 may generate sets of syntax elements that represent the transform coefficients in the quantized transform coefficient block. Video encoder 20 may apply entropy encoding operations, such as Context Adaptive Binary Arithmetic Coding (CABAC) operations, to some of these syntax elements. Other entropy coding techniques such as context adaptive variable length coding (CAVLC), probability interval partitioning entropy (PIPE) coding, or other binary arithmetic coding could also be used.

The bitstream generated by video encoder 20 may include a series of Network Abstraction Layer (NAL) units. Each of the NAL units may be a syntax structure containing an indication of a type of data in the NAL unit and bytes containing the data. For example, a NAL unit may contain data representing a video parameter set, a sequence parameter set, a picture parameter set, a coded slice, supplemental enhancement information (SEI), an access unit delimiter, filler data, or another type of data. The data in a NAL unit may include various syntax structures.

Video decoder 30 may receive the bitstream generated by video encoder 20. The bitstream may include a coded representation of the video data encoded by video encoder 20. When video decoder 30 receives the bitstream, video decoder 30 may perform a parsing operation on the bitstream. When video decoder 30 performs the parsing operation, video decoder 30 may extract syntax elements from the bitstream. Video decoder 30 may reconstruct the pictures of the video data based on the syntax elements extracted from the bitstream. The process to reconstruct the video data based on the syntax elements may be generally reciprocal to the process performed by video encoder 20 to generate the syntax elements.

After video decoder 30 extracts the syntax elements associated with a CU, video decoder 30 may generate predicted video blocks for the PUs of the CU based on the syntax elements. In addition, video decoder 30 may inverse quantize transform coefficient blocks associated with TUs of the CU. Video decoder 30 may perform inverse transforms on the transform coefficient blocks to reconstruct residual video blocks associated with the TUs of the CU. After generating the predicted video blocks and reconstructing the residual video blocks, video decoder 30 may reconstruct the video block of the CU based on the predicted video blocks and the residual video blocks. In this way, video decoder 30 may reconstruct the video blocks of CUs based on the syntax elements in the bitstream.

Video Encoder

Figure 2A:
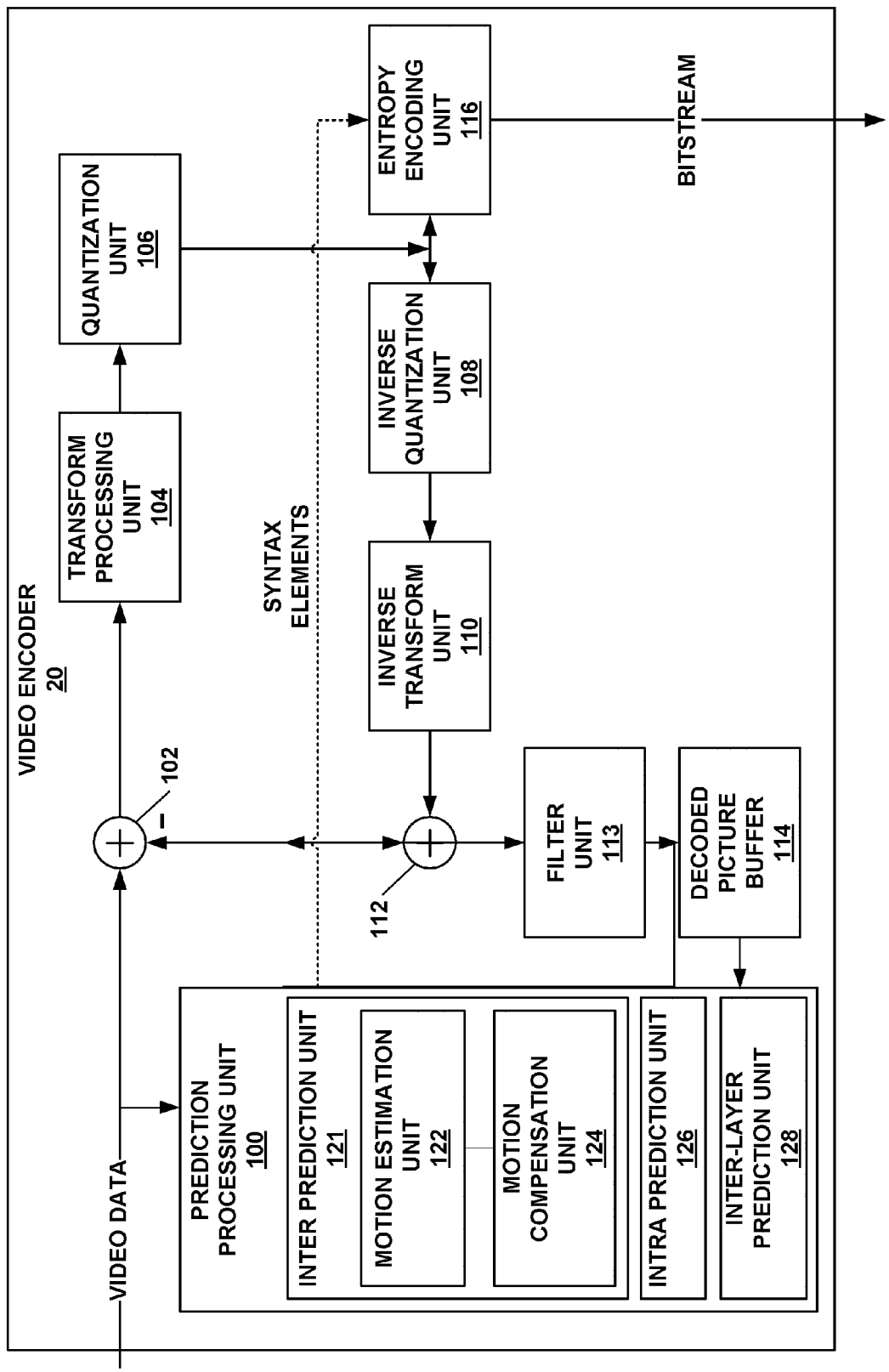
FIG. 2A is a block diagram illustrating an example of a video encoder that may implement techniques in accordance with aspects described in this disclosure.

FIG. 2A is a block diagram illustrating an example of a video encoder that may implement techniques in accordance with aspects described in this disclosure. Video encoder 20 may be configured to process a single layer of a video frame, such as for HEVC. Further, video encoder 20 may be configured to perform any or all of the techniques of this disclosure. As one example, prediction processing unit 100 may be configured to perform any or all of the techniques described in this disclosure. In another embodiment, video encoder 20 includes an optional inter-layer prediction unit 128 that is configured to perform any or all of the techniques described in this disclosure. In other embodiments, inter-layer prediction can be performed by prediction processing unit 100 (e.g., inter prediction unit 121 and/or intra prediction unit 126), in which case the inter-layer prediction unit 128 may be omitted. However, aspects of this disclosure are not so limited. In some examples, the techniques described in this disclosure may be shared among the various components of video encoder 20. In some examples, additionally or alternatively, a processor (not shown) may be configured to perform any or all of the techniques described in this disclosure.

For purposes of explanation, this disclosure describes video encoder 20 in the context of HEVC coding. However, the techniques of this disclosure may be applicable to other coding standards or methods. The example depicted in FIG. 2A is for a single layer codec. However, as will be described further with respect to FIG. 2B, some or all of video encoder 20 may be duplicated for processing of a multi-layer codec.

Video encoder 20 may perform intra- and inter-coding of video blocks within video slices. Intra coding relies on spatial prediction to reduce or remove spatial redundancy in video within a given video frame or picture. Inter-coding relies on temporal prediction to reduce or remove temporal redundancy in video within adjacent frames or pictures of a video sequence. Intra-mode (I mode) may refer to any of several spatial based coding modes. Inter-modes, such as uni-directional prediction (P mode) or bi-directional prediction (B mode), may refer to any of several temporal-based coding modes.

In the example of FIG. 2A, video encoder 20 includes a plurality of functional components. The functional components of video encoder 20 include a prediction processing unit 100, a residual generation unit 102, a transform processing unit 104, a quantization unit 106, an inverse quantization unit 108, an inverse transform unit 110, a reconstruction unit 112, a filter unit 113, a decoded picture buffer 114, and an entropy encoding unit 116. Prediction processing unit 100 includes an inter prediction unit 121, a motion estimation unit 122, a motion compensation unit 124, an intra prediction unit 126, and an inter-layer prediction unit 128. In other examples, video encoder 20 may include more, fewer, or different functional components. Furthermore, motion estimation unit 122 and motion compensation unit 124 may be highly integrated, but are represented in the example of FIG. 2A separately for purposes of explanation.

Video encoder 20 may receive video data. Video encoder 20 may receive the video data from various sources. For example, video encoder 20 may receive the video data from video source 18 (e.g., shown in FIG. 1A or 1B) or another source. The video data may represent a series of pictures. To encode the video data, video encoder 20 may perform an encoding operation on each of the pictures. As part of performing the encoding operation on a picture, video encoder 20 may perform encoding operations on each slice of the picture. As part of performing an encoding operation on a slice, video encoder 20 may perform encoding operations on treeblocks in the slice.

As part of performing an encoding operation on a treeblock, prediction processing unit 100 may perform quadtree partitioning on the video block of the treeblock to divide the video block into progressively smaller video blocks. Each of the smaller video blocks may be associated with a different CU. For example, prediction processing unit 100 may partition a video block of a treeblock into four equally-sized sub-blocks, partition one or more of the sub-blocks into four equally-sized sub-sub-blocks, and so on.

The sizes of the video blocks associated with CUs may range from 8×8 samples up to the size of the treeblock with a maximum of 64×64 samples or greater. In this disclosure, "N×N" and "N by N" may be used interchangeably to refer to the sample dimensions of a video block in terms of vertical and horizontal dimensions, e.g., 16×16 samples or 16 by 16 samples. In general, a 16×16 video block has sixteen samples in a vertical direction (y=16) and sixteen samples in a horizontal direction (x=16). Likewise, an N×N block generally has N samples in a vertical direction and N samples in a horizontal direction, where N represents a nonnegative integer value.

Furthermore, as part of performing the encoding operation on a treeblock, prediction processing unit 100 may generate a hierarchical quadtree data structure for the treeblock. For example, a treeblock may correspond to a root node of the quadtree data structure. If prediction processing unit 100 partitions the video block of the treeblock into four sub-blocks, the root node has four child nodes in the quadtree data structure. Each of the child nodes corresponds to a CU associated with one of the sub-blocks. If prediction processing unit 100 partitions one of the sub-blocks into four sub-sub-blocks, the node corresponding to the CU associated with the sub-block may have four child nodes, each of which corresponds to a CU associated with one of the sub-sub-blocks.

Each node of the quadtree data structure may contain syntax data (e.g., syntax elements) for the corresponding treeblock or CU. For example, a node in the quadtree may include a split flag that indicates whether the video block of the CU corresponding to the node is partitioned (e.g., split) into four sub-blocks. Syntax elements for a CU may be defined recursively, and may depend on whether the video block of the CU is split into sub-blocks. A CU whose video block is not partitioned may correspond to a leaf node in the quadtree data structure. A coded treeblock may include data based on the quadtree data structure for a corresponding treeblock.

Video encoder 20 may perform encoding operations on each non-partitioned CU of a treeblock. When video encoder 20 performs an encoding operation on a non-partitioned CU, video encoder 20 generates data representing an encoded representation of the non-partitioned CU.

As part of performing an encoding operation on a CU, prediction processing unit 100 may partition the video block of the CU among one or more PUs of the CU. Video encoder 20 and video decoder 30 may support various PU sizes. Assuming that the size of a particular CU is 2N×2N, video encoder 20 and video decoder 30 may support PU sizes of 2N×2N or N×N, and inter-prediction in symmetric PU sizes of 2N×2N, 2N×N, N×2N, N×N, 2N×nU, nL×2N, nR×2N, or similar. Video encoder 20 and video decoder 30 may also support asymmetric partitioning for PU sizes of 2N×nU, 2N×nD, nL×2N, and nR×2N. In some examples, prediction processing unit 100 may perform geometric partitioning to partition the video block of a CU among PUs of the CU along a boundary that does not meet the sides of the video block of the CU at right angles.

Inter prediction unit 121 may perform inter prediction on each PU of the CU. Inter prediction may provide temporal compression. To perform inter prediction on a PU, motion estimation unit 122 may generate motion information for the PU. Motion compensation unit 124 may generate a predicted video block for the PU based the motion information and decoded samples of pictures other than the picture associated with the CU (e.g., reference pictures). In this disclosure, a predicted video block generated by motion compensation unit 124 may be referred to as an inter-predicted video block.

Slices may be I slices, P slices, or B slices. Motion estimation unit 122 and motion compensation unit 124 may perform different operations for a PU of a CU depending on whether the PU is in an I slice, a P slice, or a B slice. In an I slice, all PUs are intra predicted. Hence, if the PU is in an I slice, motion estimation unit 122 and motion compensation unit 124 do not perform inter prediction on the PU.

If the PU is in a P slice, the picture containing the PU is associated with a list of reference pictures referred to as "list 0." Each of the reference pictures in list 0 contains samples that may be used for inter prediction of other pictures. When motion estimation unit 122 performs the motion estimation operation with regard to a PU in a P slice, motion estimation unit 122 may search the reference pictures in list 0 for a reference block for the PU. The reference block of the PU may be a set of samples, e.g., a block of samples, that most closely corresponds to the samples in the video block of the PU. Motion estimation unit 122 may use a variety of metrics to determine how closely a set of samples in a reference picture corresponds to the samples in the video block of a PU. For example, motion estimation unit 122 may determine how closely a set of samples in a reference picture corresponds to the samples in the video block of a PU by sum of absolute difference (SAD), sum of square difference (SSD), or other difference metrics.

After identifying a reference block of a PU in a P slice, motion estimation unit 122 may generate a reference index that indicates the reference picture in list 0 containing the reference block and a motion vector that indicates a spatial displacement between the PU and the reference block. In various examples, motion estimation unit 122 may generate motion vectors to varying degrees of precision. For example, motion estimation unit 122 may generate motion vectors at one-quarter sample precision, one-eighth sample precision, or other fractional sample precision. In the case of fractional sample precision, reference block values may be interpolated from integer-position sample values in the reference picture. Motion estimation unit 122 may output the reference index and the motion vector as the motion information of the PU. Motion compensation unit 124 may generate a predicted video block of the PU based on the reference block identified by the motion information of the PU.

If the PU is in a B slice, the picture containing the PU may be associated with two lists of reference pictures, referred to as "list 0 " and "list 1." In some examples, a picture containing a B slice may be associated with a list combination that is a combination of list 0 and list 1.

Furthermore, if the PU is in a B slice, motion estimation unit 122 may perform uni-directional prediction or bi-directional prediction for the PU. When motion estimation unit 122 performs uni-directional prediction for the PU, motion estimation unit 122 may search the reference pictures of list 0 or list 1 for a reference block for the PU. Motion estimation unit 122 may then generate a reference index that indicates the reference picture in list 0 or list 1 that contains the reference block and a motion vector that indicates a spatial displacement between the PU and the reference block. Motion estimation unit 122 may output the reference index, a prediction direction indicator, and the motion vector as the motion information of the PU. The prediction direction indicator may indicate whether the reference index indicates a reference picture in list 0 or list 1. Motion compensation unit 124 may generate the predicted video block of the PU based on the reference block indicated by the motion information of the PU.

When motion estimation unit 122 performs bi-directional prediction for a PU, motion estimation unit 122 may search the reference pictures in list 0 for a reference block for the PU and may also search the reference pictures in list 1 for another reference block for the PU. Motion estimation unit 122 may then generate reference indexes that indicate the reference pictures in list 0 and list 1 containing the reference blocks and motion vectors that indicate spatial displacements between the reference blocks and the PU. Motion estimation unit 122 may output the reference indexes and the motion vectors of the PU as the motion information of the PU. Motion compensation unit 124 may generate the predicted video block of the PU based on the reference blocks indicated by the motion information of the PU.

In some instances, motion estimation unit 122 does not output a full set of motion information for a PU to entropy encoding unit 116. Rather, motion estimation unit 122 may signal the motion information of a PU with reference to the motion information of another PU. For example, motion estimation unit 122 may determine that the motion information of the PU is sufficiently similar to the motion information of a neighboring PU. In this example, motion estimation unit 122 may indicate, in a syntax structure associated with the PU, a value that indicates to video decoder 30 that the PU has the same motion information as the neighboring PU. In another example, motion estimation unit 122 may identify, in a syntax structure associated with the PU, a neighboring PU and a motion vector difference (MVD). The motion vector difference indicates a difference between the motion vector of the PU and the motion vector of the indicated neighboring PU. Video decoder 30 may use the motion vector of the indicated neighboring PU and the motion vector difference to determine the motion vector of the PU. By referring to the motion information of a first PU when signaling the motion information of a second PU, video encoder 20 may be able to signal the motion information of the second PU using fewer bits.

As part of performing an encoding operation on a CU, intra prediction unit 126 may perform intra prediction on PUs of the CU. Intra prediction may provide spatial compression. When intra prediction unit 126 performs intra prediction on a PU, intra prediction unit 126 may generate prediction data for the PU based on decoded samples of other PUs in the same picture. The prediction data for the PU may include a predicted video block and various syntax elements. Intra prediction unit 126 may perform intra prediction on PUs in I slices, P slices, and B slices.

To perform intra prediction on a PU, intra prediction unit 126 may use multiple intra prediction modes to generate multiple sets of prediction data for the PU. When intra prediction unit 126 uses an intra prediction mode to generate a set of prediction data for the PU, intra prediction unit 126 may extend samples from video blocks of neighboring PUs across the video block of the PU in a direction and/or gradient associated with the intra prediction mode. The neighboring PUs may be above, above and to the right, above and to the left, or to the left of the PU, assuming a left-to-right, top-to-bottom encoding order for PUs, CUs, and treeblocks. Intra prediction unit 126 may use various numbers of intra prediction modes, e.g., 33 directional intra prediction modes, depending on the size of the PU.

Prediction processing unit 100 may select the prediction data for a PU from among the prediction data generated by motion compensation unit 124 for the PU or the prediction data generated by intra prediction unit 126 for the PU. In some examples, prediction processing unit 100 selects the prediction data for the PU based on rate/distortion metrics of the sets of prediction data.

If prediction processing unit 100 selects prediction data generated by intra prediction unit 126, prediction processing unit 100 may signal the intra prediction mode that was used to generate the prediction data for the PUs, e.g., the selected intra prediction mode. Prediction processing unit 100 may signal the selected intra prediction mode in various ways. For example, it may be probable that the selected intra prediction mode is the same as the intra prediction mode of a neighboring PU. In other words, the intra prediction mode of the neighboring PU may be the most probable mode for the current PU. Thus, prediction processing unit 100 may generate a syntax element to indicate that the selected intra prediction mode is the same as the intra prediction mode of the neighboring PU.

As discussed above, video encoder 20 may include inter-layer prediction unit 128. Inter-layer prediction unit 128 is configured to predict a current block (e.g., a current block in the EL) using one or more different layers that are available in scalable video coding (e.g., a BL or RL). Such prediction may be referred to as inter-layer prediction. Inter-layer prediction unit 128 utilizes prediction methods to reduce inter-layer redundancy, thereby improving coding efficiency and reducing computational resource requirements. Some examples of inter-layer prediction include inter-layer intra prediction, inter-layer motion prediction, and inter-layer residual prediction. Inter-layer intra prediction uses the reconstruction of co-located blocks in the BL to predict the current block in the EL. Inter-layer motion prediction uses motion information of the BL to predict motion in the EL. Inter-layer residual prediction uses the residue of the BL to predict the residue of the EL. Each of the inter-layer prediction schemes is discussed below in greater detail.

After prediction processing unit 100 selects the prediction data for PUs of a CU, residual generation unit 102 may generate residual data for the CU by subtracting (e.g., indicated by the minus sign) the predicted video blocks of the PUs of the CU from the video block of the CU. The residual data of a CU may include 2D residual video blocks that correspond to different sample components of the samples in the video block of the CU. For example, the residual data may include a residual video block that corresponds to differences between luminance components of samples in the predicted video blocks of the PUs of the CU and luminance components of samples in the original video block of the CU. In addition, the residual data of the CU may include residual video blocks that correspond to the differences between chrominance components of samples in the predicted video blocks of the PUs of the CU and the chrominance components of the samples in the original video block of the CU.

Prediction processing unit 100 may perform quadtree partitioning to partition the residual video blocks of a CU into sub-blocks. Each undivided residual video block may be associated with a different TU of the CU. The sizes and positions of the residual video blocks associated with TUs of a CU may or may not be based on the sizes and positions of video blocks associated with the PUs of the CU. A quadtree structure known as a "residual quad tree" (RQT) may include nodes associated with each of the residual video blocks. The TUs of a CU may correspond to leaf nodes of the RQT.

Transform processing unit 104 may generate one or more transform coefficient blocks for each TU of a CU by applying one or more transforms to a residual video block associated with the TU. Each of the transform coefficient blocks may be a 2D matrix of transform coefficients. Transform processing unit 104 may apply various transforms to the residual video block associated with a TU. For example, transform processing unit 104 may apply a discrete cosine transform (DCT), a directional transform, or a conceptually similar transform to the residual video block associated with a TU.

After transform processing unit 104 generates a transform coefficient block associated with a TU, quantization unit 106 may quantize the transform coefficients in the transform coefficient block. Quantization unit 106 may quantize a transform coefficient block associated with a TU of a CU based on a QP value associated with the CU.

Video encoder 20 may associate a QP value with a CU in various ways. For example, video encoder 20 may perform a rate-distortion analysis on a treeblock associated with the CU. In the rate-distortion analysis, video encoder 20 may generate multiple coded representations of the treeblock by performing an encoding operation multiple times on the treeblock. Video encoder 20 may associate different QP values with the CU when video encoder 20 generates different encoded representations of the treeblock. Video encoder 20 may signal that a given QP value is associated with the CU when the given QP value is associated with the CU in a coded representation of the treeblock that has a lowest bitrate and distortion metric.

Inverse quantization unit 108 and inverse transform unit 110 may apply inverse quantization and inverse transforms to the transform coefficient block, respectively, to reconstruct a residual video block from the transform coefficient block. Reconstruction unit 112 may add the reconstructed residual video block to corresponding samples from one or more predicted video blocks generated by prediction processing unit 100 to produce a reconstructed video block associated with a TU. By reconstructing video blocks for each TU of a CU in this way, video encoder 20 may reconstruct the video block of the CU.

After reconstruction unit 112 reconstructs the video block of a CU, filter unit 113 may perform a deblocking operation to reduce blocking artifacts in the video block associated with the CU. After performing the one or more deblocking operations, filter unit 113 may store the reconstructed video block of the CU in decoded picture buffer 114. Motion estimation unit 122 and motion compensation unit 124 may use a reference picture that contains the reconstructed video block to perform inter prediction on PUs of subsequent pictures. In addition, intra prediction unit 126 may use reconstructed video blocks in decoded picture buffer 114 to perform intra prediction on other PUs in the same picture as the CU.

Entropy encoding unit 116 may receive data from other functional components of video encoder 20. For example, entropy encoding unit 116 may receive transform coefficient blocks from quantization unit 106 and may receive syntax elements from prediction processing unit 100. When entropy encoding unit 116 receives the data, entropy encoding unit 116 may perform one or more entropy encoding operations to generate entropy encoded data. For example, video encoder 20 may perform a CAVLC operation, a CABAC operation, a variable-to-variable (V2V) length coding operation, a syntax-based context-adaptive binary arithmetic coding (SBAC) operation, a Probability Interval Partitioning Entropy (PIPE) coding operation, or another type of entropy encoding operation on the data. Entropy encoding unit 116 may output a bitstream that includes the entropy encoded data.

As part of performing an entropy encoding operation on data, entropy encoding unit 116 may select a context model. If entropy encoding unit 116 is performing a CABAC operation, the context model may indicate estimates of probabilities of particular bins having particular values. In the context of CABAC, the term "bin" is used to refer to a bit of a binarized version of a syntax element.

Multi-Layer Video Encoder

Figure 2B:
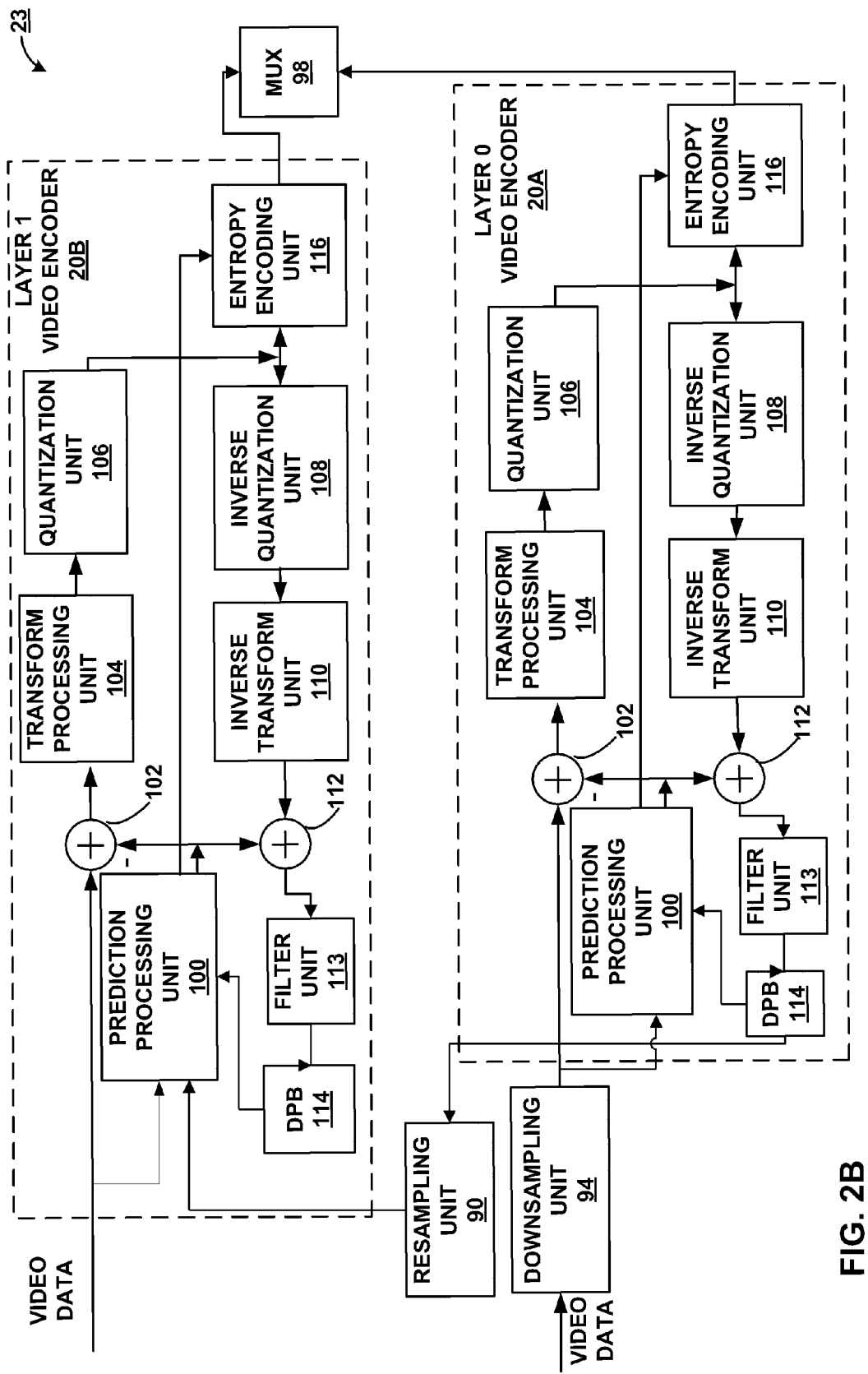
FIG. 2B is a block diagram illustrating an example of a video encoder that may implement techniques in accordance with aspects described in this disclosure.

FIG. 2B is a block diagram illustrating an example of a multi-layer video encoder 23 (also simply referred to as video encoder 23) that may implement techniques in accordance with aspects described in this disclosure. Video encoder 23 may be configured to process multi-layer video frames, such as for SHVC and multiview coding. Further, video encoder 23 may be configured to perform any or all of the techniques of this disclosure.

Video encoder 23 includes a video encoder 20A and video encoder 20B, each of which may be configured as video encoder 20 and may perform the functions described above with respect to video encoder 20. Further, as indicated by the reuse of reference numbers, video encoders 20A and 20B may include at least some of the systems and subsystems as video encoder 20. Although video encoder 23 is illustrated as including two video encoders 20A and 20B, video encoder 23 is not limited as such and may include any number of video encoder 20 layers. In some embodiments, video encoder 23 may include a video encoder 20 for each picture or frame in an access unit. For example, an access unit that includes five pictures may be processed or encoded by a video encoder that includes five encoder layers. In some embodiments, video encoder 23 may include more encoder layers than frames in an access unit. In some such cases, some of the video encoder layers may be inactive when processing some access units.

In addition to video encoders 20A and 20B, video encoder 23 may include an resampling unit 90. The resampling unit 90 may, in some cases, upsample a BL of a received video frame to, for example, create an EL. The resampling unit 90 may upsample particular information associated with the received BL of a frame, but not other information. For example, the resampling unit 90 may upsample the spatial size or number of pixels of the BL, but the number of slices or the picture order count may remain constant. In some cases, the resampling unit 90 may not process the received video and/or may be optional. For example, in some cases, the prediction processing unit 100 may perform upsampling. In some embodiments, the resampling unit 90 is configured to upsample a layer and reorganize, redefine, modify, or adjust one or more slices to comply with a set of slice boundary rules and/or raster scan rules. Although primarily described as upsampling a BL, or a lower layer in an access unit, in some cases, the resampling unit 90 may downsample a layer. For example, if during streaming of a video bandwidth is reduced, a frame may be downsampled instead of upsampled.

The resampling unit 90 may be configured to receive a picture or frame (or picture information associated with the picture) from the decoded picture buffer 114 of the lower layer encoder (e.g., video encoder 20A) and to upsample the picture (or the received picture information). This upsampled picture may then be provided to the prediction processing unit 100 of a higher layer encoder (e.g., video encoder 20B) configured to encode a picture in the same access unit as the lower layer encoder. In some cases, the higher layer encoder is one layer removed from the lower layer encoder. In other cases, there may be one or more higher layer encoders between the layer 0 video encoder and the layer 1 encoder of FIG. 2B.

In some cases, the resampling unit 90 may be omitted or bypassed. In such cases, the picture from the decoded picture buffer 114 of video encoder 20A may be provided directly, or at least without being provided to the resampling unit 90, to the prediction processing unit 100 of video encoder 20B. For example, if video data provided to video encoder 20B and the reference picture from the decoded picture buffer 114 of video encoder 20A are of the same size or resolution, the reference picture may be provided to video encoder 20B without any resampling.

In some embodiments, video encoder 23 downsamples video data to be provided to the lower layer encoder using the downsampling unit 94 before provided the video data to video encoder 20A. Alternatively, the downsampling unit 94 may be a resampling unit 90 capable of upsampling or downsampling the video data. In yet other embodiments, the downsampling unit 94 may be omitted.

As illustrated in FIG. 2B, video encoder 23 may further include a multiplexor 98, or mux. The mux 98 can output a combined bitstream from video encoder 23. The combined bitstream may be created by taking a bitstream from each of video encoders 20A and 20B and alternating which bitstream is output at a given time. While in some cases the bits from the two (or more in the case of more than two video encoder layers) bitstreams may be alternated one bit at a time, in many cases the bitstreams are combined differently. For example, the output bitstream may be created by alternating the selected bitstream one block at a time. In another example, the output bitstream may be created by outputting a non-1:1 ratio of blocks from each of video encoders 20A and 20B. For instance, two blocks may be output from video encoder 20B for each block output from video encoder 20A. In some embodiments, the output stream from the mux 98 may be preprogrammed. In other embodiments, the mux 98 may combine the bitstreams from video encoders 20A, 20B based on a control signal received from a system external to video encoder 23, such as from a processor on a source device including the source device 12. The control signal may be generated based on the resolution or bitrate of a video from the video source 18, based on a bandwidth of the link 16, based on a subscription associated with a user (e.g., a paid subscription versus a free subscription), or based on any other factor for determining a resolution output desired from video encoder 23.

Video Decoder

Figure 3A:
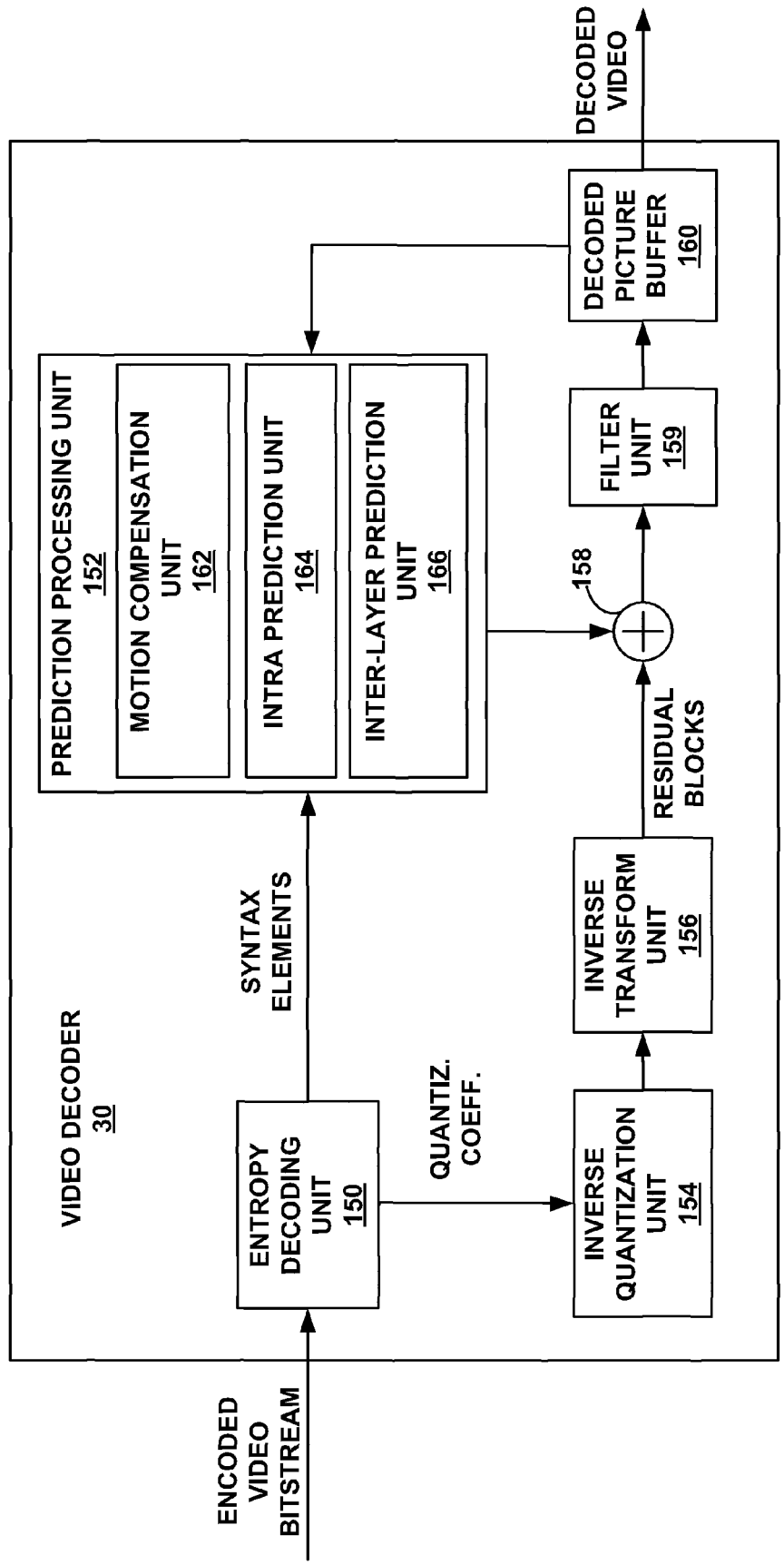
FIG. 3A is a block diagram illustrating an example of a video decoder that may implement techniques in accordance with aspects described in this disclosure.

FIG. 3A is a block diagram illustrating an example of a video decoder that may implement techniques in accordance with aspects described in this disclosure. Video decoder 30 may be configured to process a single layer of a video frame, such as for HEVC. Further, video decoder 30 may be configured to perform any or all of the techniques of this disclosure. As one example, motion compensation unit 162 and/or intra prediction unit 164 may be configured to perform any or all of the techniques described in this disclosure. In one embodiment, video decoder 30 may optionally include inter-layer prediction unit 166 that is configured to perform any or all of the techniques described in this disclosure. In other embodiments, inter-layer prediction can be performed by prediction processing unit 152 (e.g., motion compensation unit 162 and/or intra prediction unit 164), in which case the inter-layer prediction unit 166 may be omitted. However, aspects of this disclosure are not so limited. In some examples, the techniques described in this disclosure may be shared among the various components of video decoder 30. In some examples, additionally or alternatively, a processor (not shown) may be configured to perform any or all of the techniques described in this disclosure.

For purposes of explanation, this disclosure describes video decoder 30 in the context of HEVC coding. However, the techniques of this disclosure may be applicable to other coding standards or methods. The example depicted in FIG. 3A is for a single layer codec. However, as will be described further with respect to FIG. 3B, some or all of video decoder 30 may be duplicated for processing of a multi-layer codec.

In the example of FIG. 3A, video decoder 30 includes a plurality of functional components. The functional components of video decoder 30 include an entropy decoding unit 150, a prediction processing unit 152, an inverse quantization unit 154, an inverse transform unit 156, a reconstruction unit 158, a filter unit 159, and a decoded picture buffer 160. Prediction processing unit 152 includes a motion compensation unit 162, an intra prediction unit 164, and an inter-layer prediction unit 166. In some examples, video decoder 30 may perform a decoding pass generally reciprocal to the encoding pass described with respect to video encoder 20 of FIG. 2A. In other examples, video decoder 30 may include more, fewer, or different functional components.

Video decoder 30 may receive a bitstream that comprises encoded video data. The bitstream may include a plurality of syntax elements. When video decoder 30 receives the bitstream, entropy decoding unit 150 may perform a parsing operation on the bitstream. As a result of performing the parsing operation on the bitstream, entropy decoding unit 150 may extract syntax elements from the bitstream. As part of performing the parsing operation, entropy decoding unit 150 may entropy decode entropy encoded syntax elements in the bitstream. Prediction processing unit 152, inverse quantization unit 154, inverse transform unit 156, reconstruction unit 158, and filter unit 159 may perform a reconstruction operation that generates decoded video data based on the syntax elements extracted from the bitstream.

As discussed above, the bitstream may comprise a series of NAL units. The NAL units of the bitstream may include video parameter set NAL units, sequence parameter set NAL units, picture parameter set NAL units, SEI NAL units, and so on. As part of performing the parsing operation on the bitstream, entropy decoding unit 150 may perform parsing operations that extract and entropy decode sequence parameter sets from sequence parameter set NAL units, picture parameter sets from picture parameter set NAL units, SEI data from SEI NAL units, and so on.

In addition, the NAL units of the bitstream may include coded slice NAL units. As part of performing the parsing operation on the bitstream, entropy decoding unit 150 may perform parsing operations that extract and entropy decode coded slices from the coded slice NAL units. Each of the coded slices may include a slice header and slice data. The slice header may contain syntax elements pertaining to a slice. The syntax elements in the slice header may include a syntax element that identifies a picture parameter set associated with a picture that contains the slice. Entropy decoding unit 150 may perform entropy decoding operations, such as CABAC decoding operations, on syntax elements in the coded slice header to recover the slice header.

As part of extracting the slice data from coded slice NAL units, entropy decoding unit 150 may perform parsing operations that extract syntax elements from coded CUs in the slice data. The extracted syntax elements may include syntax elements associated with transform coefficient blocks. Entropy decoding unit 150 may then perform CABAC decoding operations on some of the syntax elements.

After entropy decoding unit 150 performs a parsing operation on a non-partitioned CU, video decoder 30 may perform a reconstruction operation on the non-partitioned CU. To perform the reconstruction operation on a non-partitioned CU, video decoder 30 may perform a reconstruction operation on each TU of the CU. By performing the reconstruction operation for each TU of the CU, video decoder 30 may reconstruct a residual video block associated with the CU.

As part of performing a reconstruction operation on a TU, inverse quantization unit 154 may inverse quantize, e.g., de-quantize, a transform coefficient block associated with the TU. Inverse quantization unit 154 may inverse quantize the transform coefficient block in a manner similar to the inverse quantization processes proposed for HEVC or defined by the H.264 decoding standard. Inverse quantization unit 154 may use a quantization parameter QP calculated by video encoder 20 for a CU of the transform coefficient block to determine a degree of quantization and, likewise, a degree of inverse quantization for inverse quantization unit 154 to apply.

After inverse quantization unit 154 inverse quantizes a transform coefficient block, inverse transform unit 156 may generate a residual video block for the TU associated with the transform coefficient block. Inverse transform unit 156 may apply an inverse transform to the transform coefficient block in order to generate the residual video block for the TU. For example, inverse transform unit 156 may apply an inverse DCT, an inverse integer transform, an inverse Karhunen-Loeve transform (KLT), an inverse rotational transform, an inverse directional transform, or another inverse transform to the transform coefficient block. In some examples, inverse transform unit 156 may determine an inverse transform to apply to the transform coefficient block based on signaling from video encoder 20. In such examples, inverse transform unit 156 may determine the inverse transform based on a signaled transform at the root node of a quadtree for a treeblock associated with the transform coefficient block. In other examples, inverse transform unit 156 may infer the inverse transform from one or more coding characteristics, such as block size, coding mode, or the like. In some examples, inverse transform unit 156 may apply a cascaded inverse transform.

In some examples, motion compensation unit 162 may refine the predicted video block of a PU by performing interpolation based on interpolation filters. Identifiers for interpolation filters to be used for motion compensation with sub-sample precision may be included in the syntax elements. Motion compensation unit 162 may use the same interpolation filters used by video encoder 20 during generation of the predicted video block of the PU to calculate interpolated values for sub-integer samples of a reference block. Motion compensation unit 162 may determine the interpolation filters used by video encoder 20 according to received syntax information and use the interpolation filters to produce the predicted video block.

If a PU is encoded using intra prediction, intra prediction unit 164 may perform intra prediction to generate a predicted video block for the PU. For example, intra prediction unit 164 may determine an intra prediction mode for the PU based on syntax elements in the bitstream. The bitstream may include syntax elements that intra prediction unit 164 may use to determine the intra prediction mode of the PU.

In some instances, the syntax elements may indicate that intra prediction unit 164 is to use the intra prediction mode of another PU to determine the intra prediction mode of the current PU. For example, it may be probable that the intra prediction mode of the current PU is the same as the intra prediction mode of a neighboring PU. In other words, the intra prediction mode of the neighboring PU may be the most probable mode for the current PU. Hence, in this example, the bitstream may include a small syntax element that indicates that the intra prediction mode of the PU is the same as the intra prediction mode of the neighboring PU. Intra prediction unit 164 may then use the intra prediction mode to generate prediction data (e.g., predicted samples) for the PU based on the video blocks of spatially neighboring PUs.

As discussed above, video decoder 30 may also include inter-layer prediction unit 166. Inter-layer prediction unit 166 is configured to predict a current block (e.g., a current block in the EL) using one or more different layers that are available in scalable video coding (e.g., a BL or RL). Such prediction may be referred to as inter-layer prediction. Inter-layer prediction unit 166 utilizes prediction methods to reduce inter-layer redundancy, thereby improving coding efficiency and reducing computational resource requirements. Some examples of inter-layer prediction include inter-layer intra prediction, inter-layer motion prediction, and inter-layer residual prediction. Inter-layer intra prediction uses the reconstruction of co-located blocks in the BL to predict the current block in the EL. Inter-layer motion prediction uses motion information of the BL to predict motion in the EL. Inter-layer residual prediction uses the residue of the BL to predict the residue of the EL. Each of the inter-layer prediction schemes is discussed below in greater detail.

Reconstruction unit 158 may use the residual video blocks associated with TUs of a CU and the predicted video blocks of the PUs of the CU, e.g., either intra-prediction data or inter-prediction data, as applicable, to reconstruct the video block of the CU. Thus, video decoder 30 may generate a predicted video block and a residual video block based on syntax elements in the bitstream and may generate a video block based on the predicted video block and the residual video block.

After reconstruction unit 158 reconstructs the video block of the CU, filter unit 159 may perform a deblocking operation to reduce blocking artifacts associated with the CU. After filter unit 159 performs a deblocking operation to reduce blocking artifacts associated with the CU, video decoder 30 may store the video block of the CU in decoded picture buffer 160. Decoded picture buffer 160 may provide reference pictures for subsequent motion compensation, intra prediction, and presentation on a display device, such as display device 32 of FIG. 1A or 1B. For instance, video decoder 30 may perform, based on the video blocks in decoded picture buffer 160, intra prediction or inter prediction operations on PUs of other CUs.

Multi-Layer Decoder

Figure 3B:
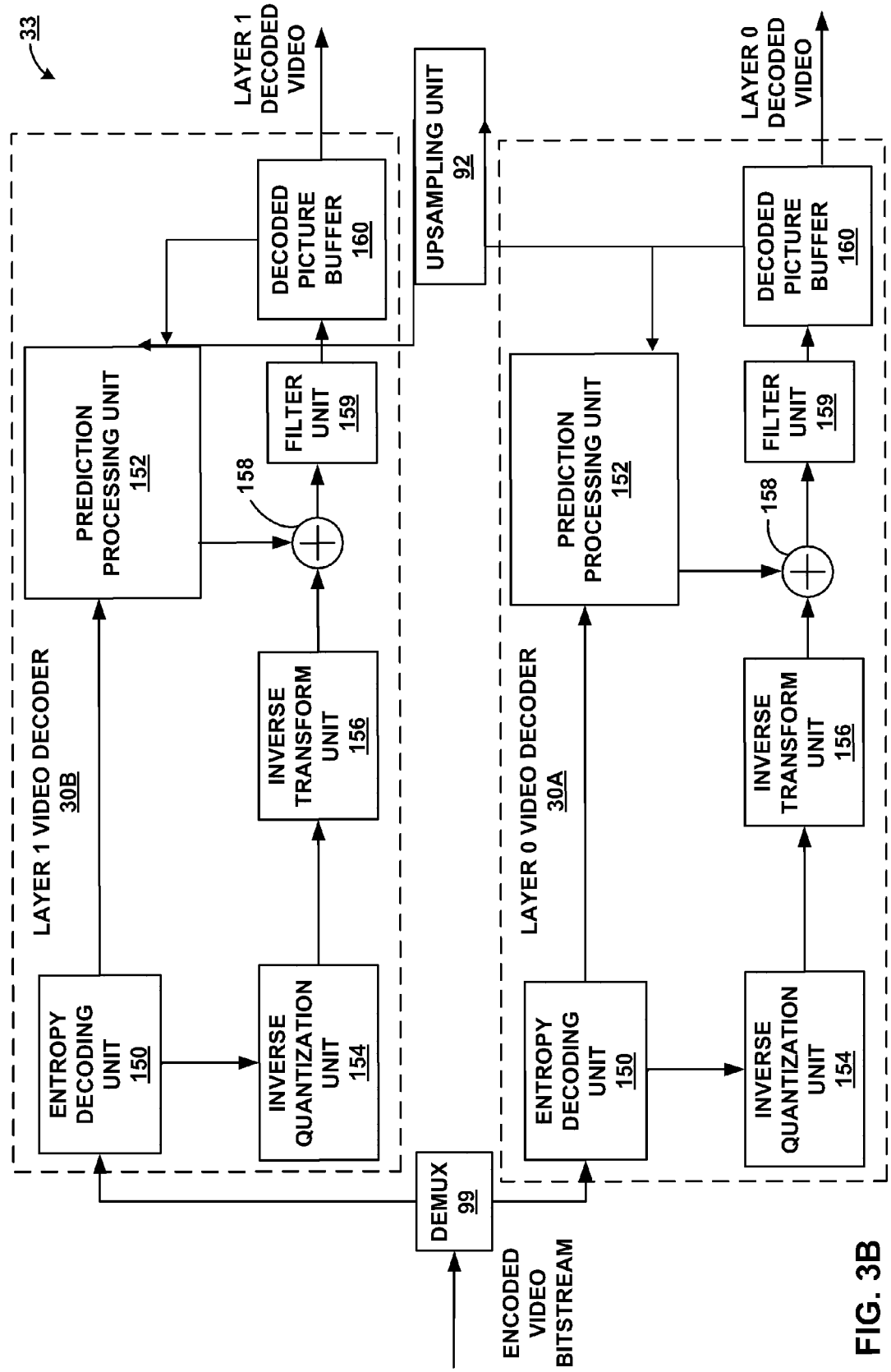
FIG. 3B is a block diagram illustrating an example of a video decoder that may implement techniques in accordance with aspects described in this disclosure.

FIG. 3B is a block diagram illustrating an example of a multi-layer video decoder 33 (also simply referred to as video decoder 33) that may implement techniques in accordance with aspects described in this disclosure. Video decoder 33 may be configured to process multi-layer video frames, such as for SHVC and multiview coding. Further, video decoder 33 may be configured to perform any or all of the techniques of this disclosure.

Video decoder 33 includes a video decoder 30A and video decoder 30B, each of which may be configured as video decoder 30 and may perform the functions described above with respect to video decoder 30. Further, as indicated by the reuse of reference numbers, video decoders 30A and 30B may include at least some of the systems and subsystems as video decoder 30. Although video decoder 33 is illustrated as including two video decoders 30A and 30B, video decoder 33 is not limited as such and may include any number of video decoder 30 layers. In some embodiments, video decoder 33 may include a video decoder 30 for each picture or frame in an access unit. For example, an access unit that includes five pictures may be processed or decoded by a video decoder that includes five decoder layers. In some embodiments, video decoder 33 may include more decoder layers than frames in an access unit. In some such cases, some of the video decoder layers may be inactive when processing some access units.

In addition to video decoders 30A and 30B, video decoder 33 may include an upsampling unit 92. In some embodiments, the upsampling unit 92 may upsample a BL of a received video frame to create an enhanced layer to be added to the reference picture list for the frame or access unit. This enhanced layer can be stored in the decoded picture buffer 160. In some embodiments, the upsampling unit 92 can include some or all of the embodiments described with respect to the resampling unit 90 of FIG. 2A. In some embodiments, the upsampling unit 92 is configured to upsample a layer and reorganize, redefine, modify, or adjust one or more slices to comply with a set of slice boundary rules and/or raster scan rules. In some cases, the upsampling unit 92 may be a resampling unit configured to upsample and/or downsample a layer of a received video frame The upsampling unit 92 may be configured to receive a picture or frame (or picture information associated with the picture) from the decoded picture buffer 160 of the lower layer decoder (e.g., video decoder 30A) and to upsample the picture (or the received picture information). This upsampled picture may then be provided to the prediction processing unit 152 of a higher layer decoder (e.g., video decoder 30B) configured to decode a picture in the same access unit as the lower layer decoder. In some cases, the higher layer decoder is one layer removed from the lower layer decoder. In other cases, there may be one or more higher layer decoders between the layer 0 decoder and the layer 1 decoder of FIG. 3B.

In some cases, the upsampling unit 92 may be omitted or bypassed. In such cases, the picture from the decoded picture buffer 160 of video decoder 30A may be provided directly, or at least without being provided to the upsampling unit 92, to the prediction processing unit 152 of video decoder 30B. For example, if video data provided to video decoder 30B and the reference picture from the decoded picture buffer 160 of video decoder 30A are of the same size or resolution, the reference picture may be provided to video decoder 30B without upsampling. Further, in some embodiments, the upsampling unit 92 may be a resampling unit 90 configured to upsample or downsample a reference picture received from the decoded picture buffer 160 of video decoder 30A.

As illustrated in FIG. 3B, video decoder 33 may further include a demultiplexor 99, or demux. The demux 99 can split an encoded video bitstream into multiple bitstreams with each bitstream output by the demux 99 being provided to a different video decoder 30A and 30B. The multiple bitstreams may be created by receiving a bitstream and each of video decoders 30A and 30B receives a portion of the bitstream at a given time. While in some cases the bits from the bitstream received at the demux 99 may be alternated one bit at a time between each of video decoders (e.g., video decoders 30A and 30B in the example of FIG. 3B), in many cases the bitstream is divided differently. For example, the bitstream may be divided by alternating which video decoder receives the bitstream one block at a time. In another example, the bitstream may be divided by a non-1:1 ratio of blocks to each of video decoders 30A and 30B. For instance, two blocks may be provided to video decoder 30B for each block provided to video decoder 30A. In some embodiments, the division of the bitstream by the demux 99 may be preprogrammed. In other embodiments, the demux 99 may divide the bitstream based on a control signal received from a system external to video decoder 33, such as from a processor on a destination device including the destination device 14. The control signal may be generated based on the resolution or bitrate of a video from the input interface 28, based on a bandwidth of the link 16, based on a subscription associated with a user (e.g., a paid subscription versus a free subscription), or based on any other factor for determining a resolution obtainable by video decoder 33.

Layer Sets, Output Layer Sets, and Partitioning Schemes

In some embodiments, video data from an encoder may be decoded or output differently depending upon the needs or capabilities of the decoder. For example, a first decoder may, in order to produce the highest quality picture, decode and output all layers of the encoded video data. On the other hand, a different decoder may not need to produce the highest quality picture (due to screen size, processing power, and/or other limitations), and thus may only decode and output a subset of the layers.

The encoder, when producing the encoded video data bitstream, may specify various the layer sets and output layer sets that may be used when decoding the video data. For example, the first layer set may be specified that includes all layers of the video data, as well as a second layer set that only includes a subset of the layers of video data. A decoder, depending on its particular configuration, may select a particular layer set and/or output layer set to be used when decoding the video data.

In some embodiments, video data may be transmitted between the encoder and decoder through one or more different partitions, wherein a partition contains one or more layers of video data. The arrangement of layers to partitions may be determined based upon a specified partitioning scheme. In some embodiments, the partitioning scheme used may be based upon a layer set and/or output layer set used. In addition, the partitioning scheme may also be based at least in part upon the requirements of the decoder and/or format of the video data.

Figure 4A:
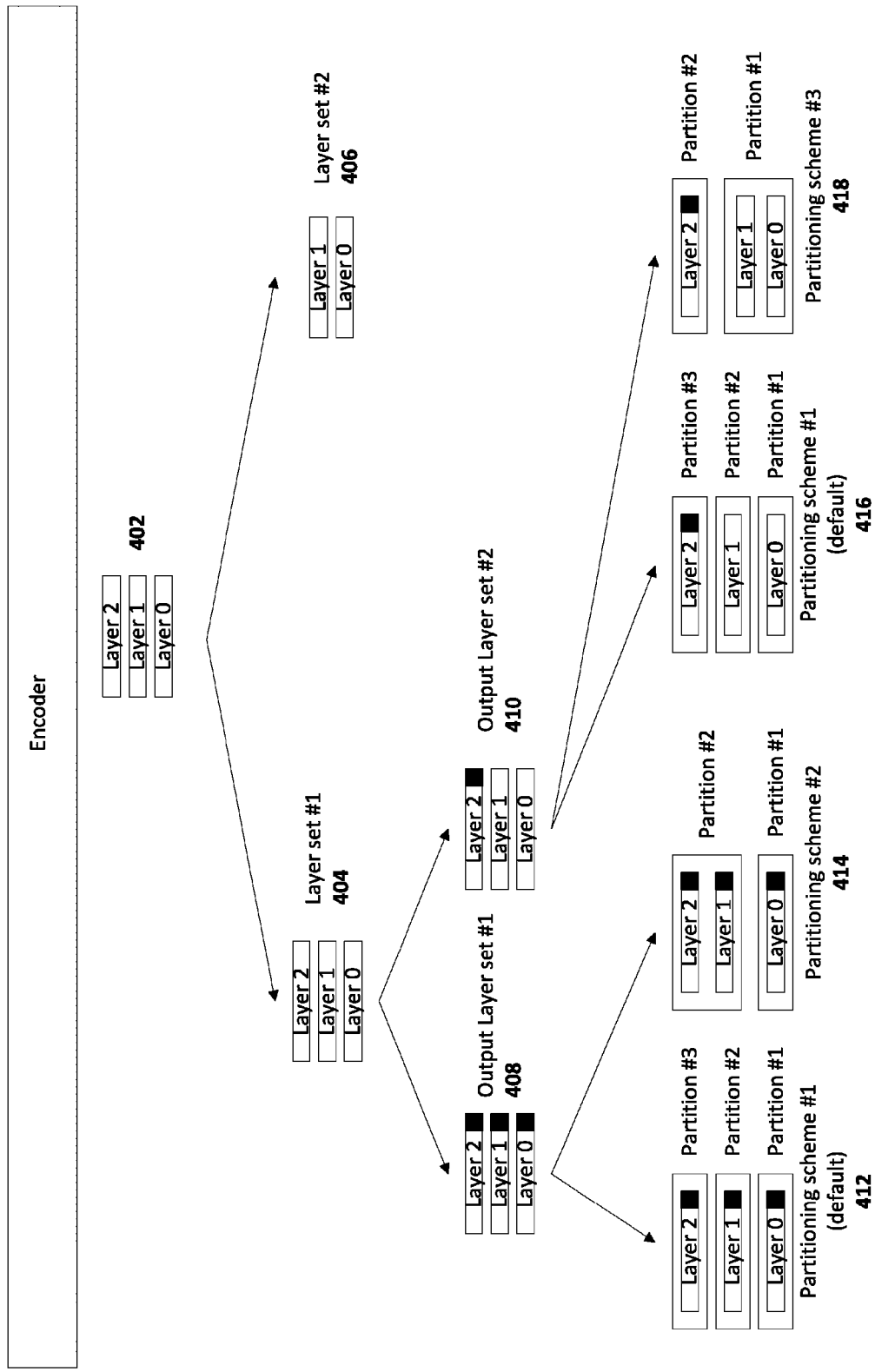
FIGS. 4A and 4B illustrate relationships between video data layers, layer sets, output layer sets, and partitioning schemes, in accordance with aspects described in this disclosure.
Figure 4B:
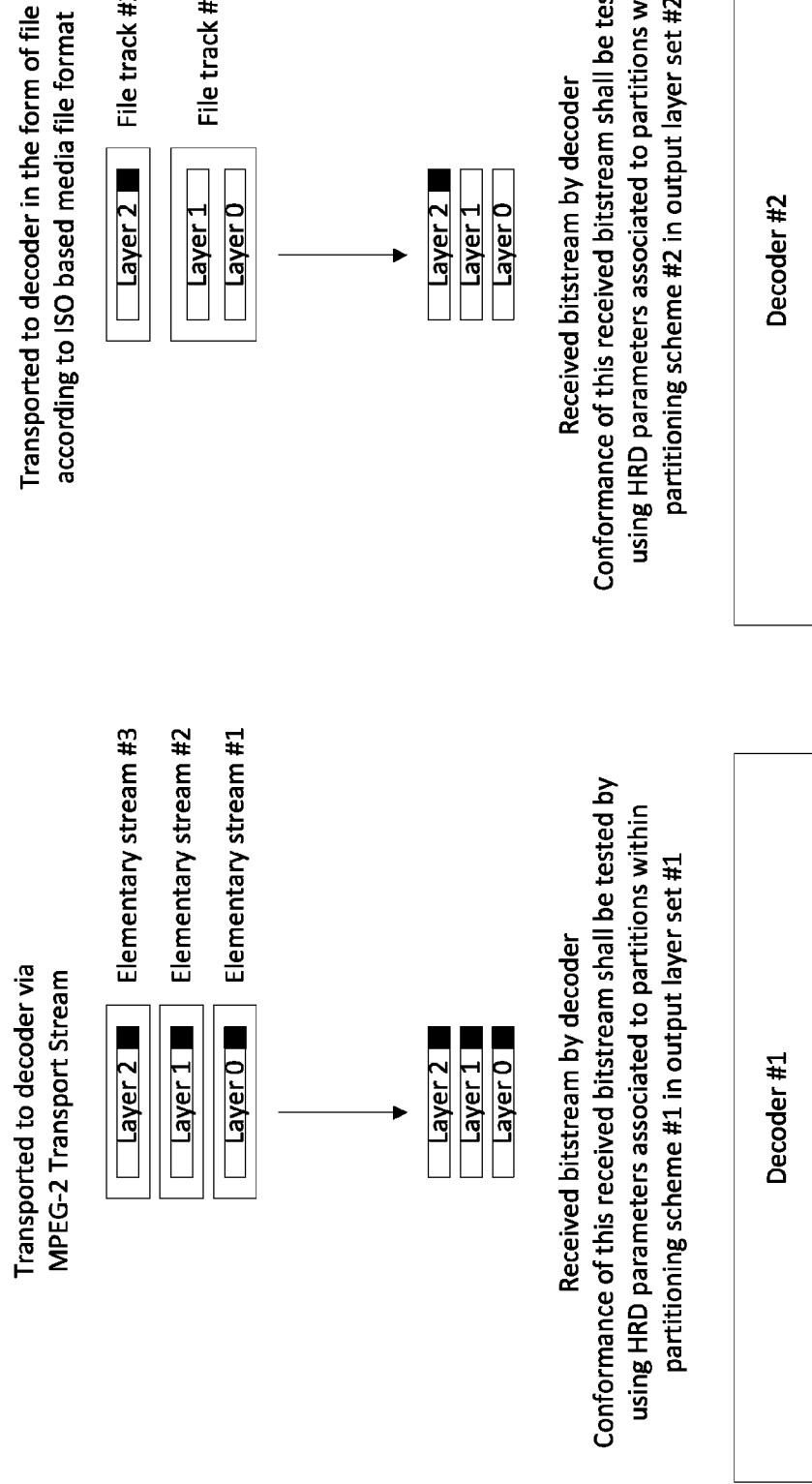

FIGS. 4A and 4B illustrate relationships between video data layers, layer sets, output layer sets, and partitioning schemes, in accordance with aspects described in this disclosure. As described above, the video data may comprise a plurality of layers 402. For example, as illustrated in FIG. 4A, the video data comprises three different layers: a bottom layer "Layer 0," as well as a "Layer 1" and a "Layer 2."

The video data may be associated with one or more different layer sets. A layer set corresponds to a subset of the total layers that will be processed by a decoder. In some embodiments, different decoders may make use different layer sets. For example, encoded video data may be transmitted from the encoder to a plurality of different decoders. The decoders may be associated with different types of outputs or applications with different needs or capabilities. For example, a first decoder may be associated with a large television or computer monitor screen, while a second decoder may be associated with a small smartphone screen. Thus, the first decoder may be configured to process a larger layer set in order to obtain a higher quality picture, compared to the second decoder, wherein obtaining maximum picture quality may not be as big a concern.

As illustrated in the figure, layers 402 may be associated with a first layer set 404 that comprises all three layers of layers 402, and a second layer set 406 that comprises only two of the three layers. If a decoder uses a layer set that does not contain all layers of layers 402 (e.g., second layer set 406), the decoder will only process the layers included in the layer set (e.g., layer 0 and layer 1), while ignoring or discarding any remaining layers not part of the layer set (e.g., layer 2).

In some embodiments, each layer set may be associated with one or more different output layer sets. An output layer set associated with a layer set corresponds to a subset of layers in the layer set that will actually be output by the decoder after decoding. For example, first layer set 404 may be associated with a first output layer set 408 and a second output layer set 410. Similarly, second layer set 406 may also be associated with one or more different output layer sets (not shown). It is understood that references to a "first" output layer set, a "second" output layer set, etc. of one or more output layer sets do not necessarily refer to a specific output layer set of the one or more output layer sets or a particular order of the one or more output layer sets, but instead may correspond to any individual output layer set of the one or more output layer sets.

While a decoder will process/decode all layers specified in a given layer set, only the layers that are part of the output layer set will be output to be displayed. For example, a decoder that uses second output layer set 410 will decode all three layers of layer set 404 (layer 0, layer 1, and layer 2). However, only the decoded layer 2 will actually be output for display. In some embodiments, this may be because a layer specified in the output layer set (e.g., layer 2) is dependent upon other layers not in the output layer set (e.g., layer 0, layer 1), thus necessitating that the other layers of the layer set being decoded even though they are not actually output for display.

An encoded video bitstream may be transmitted between the encoder and decoder as one or more partitions. In some embodiments, a partition may correspond to an elementary stream in a transport stream or a track in a file, and may contain one or more layers of video data. In some embodiments, each output layer set may be associated with one or more different partitioning schemes that define how the layers of video data between different partitions when being transmitted between the encoder and decoder.

For example, first output layer set 408 may be associated with a first partitioning scheme where each layer is in its own separate partition, as well as a second partitioning scheme where Layer 0 is part of a first partition, while Layers 1 and 2 share a second partition. Similarly, second output layer set 410 may be associated with a first partitioning scheme where each layer is in its own separate partition, as well as a second partitioning scheme different from the first partitioning scheme (e.g., Layers 0 and 1 sharing a first partition, and Layer 2 being in a separate second partition). In some embodiments, the partitioning scheme where each layer is in its own separate partition is considered a default partitioning scheme.

In some embodiments, a partitioning scheme used may be based at least in part upon a media file format associated with the video data. For example, as illustrated in FIG. 4B, if the video data is to be transported via an MPEG-2 Transport Stream, a particular partitioning scheme may be used (e.g., each layer in its own separate partition). On the other hand, if the video data is to be transported in accordance with an ISO based media file format, a different partitioning scheme may be used. After the video data is received, conformance of the received video data may be tested using the conformance parameters (e.g., HRD parameters) that are associated with the partitions of the partitioning scheme and output layer set.

Mapping HRD Parameters

In some embodiments, hypothetical reference decoder (HRD) parameters may be used to test the conformance of the received video data bitstream to an expected format. For example, when a decoder receives the video bitstream comprising one or more partitions, HRD parameters that are mapped to the received partitions are identified. Conformance of the received bitstream may then be tested by comparing the HRD parameters associated with partitions within the partitioning scheme with the received partition.

In some embodiments, different layer sets may be associated with the same partitioning schemes and partitions. For example, as illustrated in FIG. 4A, layer set 404 may be associated with partitioning schemes 412 and 416, which are the same partitioning scheme (e.g., a default partitioning scheme where each layer is in its own separate partition) having the same partitions (e.g., a partition #1 containing Layer 0).

While some HRD parameters may be independent of whether a layer in a partition is an output layer or not, as defined by the output layer set that the partitioning scheme is associated with, other HRD parameters are dependent upon output layer set. For example, the HRD parameters may include syntax elements such as fixed_pic_rate_general_flag[ ], fixed_pic_rate_cvs_flag[ ], elemental_duration_in_tc_minus1[ ], etc. that are dependent upon the output layer set that apply to.

Thus, because the same partition (e.g., partition #1 in partitioning scheme 412 and partition #1 in partitioning scheme 416) may be associated with different output layer sets (e.g., Layer 0 is partitioning scheme 412 is an output layer, while Layer 0 in partitioning scheme 416 is not an output layer), it is insufficient for HRD parameters to only be mapped to partitions by layer set, as the HRD parameters associated with partition may need to be different depending upon the specific output layer set that the partition is associated with. As a result, the HRD parameters, instead of only being mapped to a partition, is also mapped to the output layer set that the partition/partitioning scheme is associated with.

Figure 5A:
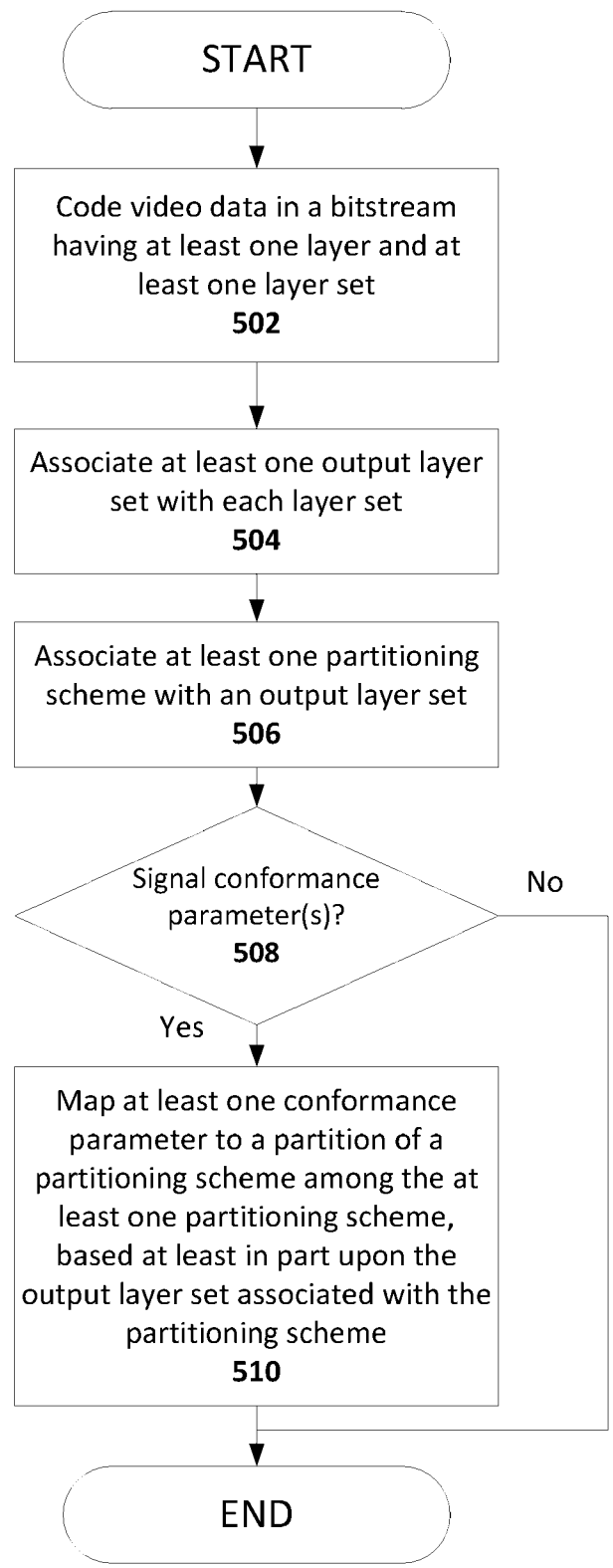
FIG. 5A illustrates a flowchart of a method for mapping HRD parameters in encoded video data, in accordance with aspects described in this disclosure.

FIG. 5A illustrates a flowchart of a method for mapping conformance parameters, such as HRD parameters, in encoded video data, in accordance with aspects described in this disclosure. In some embodiments, the method may be performed by a video encoder, such as the encoders illustrated in FIGS. 2A and/or 2B. Starting at block 502, video data is coded to form a video data bitstream containing at least one layer. The video data may be associated with one or more layer sets. A layer set specifies the layers of the video data bitstream that will be processed by a decoder. In some embodiments, a layer set may comprise all layers in the video data bitstream, or only a subset of the layers of the video data bitstream.

At block 504, each layer set is associated with one or more output layer sets. While a layer set specifies the layers of video data to be processed by a decoder, an output layer set specifies the layers that will actually be output by the decoder. An output layer set may comprise all layers of its associated layer set, or a subset of the layers in the layer set.

At block 506, each output layer set is associated with one or more partitioning schemes. A partitioning scheme specifies how the layers of video data are to be partitioned during transmission between encoder and decoder. Each partition of a partitioning scheme may contain one or more layers of the video data. In some embodiments, each output layer set is associated with a default partitioning scheme and one or more additional partitioning schemes.

At block 508, a determination may be made as to whether one or more conformance parameters (e.g., HRD parameters) are to be signaled as part of the video data bitstream. In some embodiments, the decision of whether or not conformance parameters will be signaled, as well as what conformance parameters to signal, may be based at least in part upon the encoder and/or one or more encoder configuration settings At block 510, in response to a determination that one or more conformance parameters are to be signaled as part of the video data bitstream, at least one conformance parameter is mapped to a partition of a partitioning scheme among the at least one partitioning scheme, based at least in part upon the output layer set that is associated with the partitioning scheme. By mapping the conformance parameters based at least in part upon output layer set, identical partitioning schemes that specify the same partitions but are associated with different output layer sets are able to have different mapped conformance parameters. As such, a first parameter may be mapped to a partition of a partitioning scheme associated with a first output layer set, while a second, different parameter may be mapped to the partition of the partitioning scheme when associated with a second output layer set. For example, partitioning scheme 412 and partitioning scheme 416, as illustrated in FIG. 4A, despite being the same partitioning scheme (e.g., the default partitioning scheme), may have different mapped conformance parameters because they are associated with different output layer sets. It is understood that references to a "first" conformance parameter, a "second" conformance parameter, etc. of one or more conformance parameters do not necessarily refer to a specific conformance parameter of the one or more conformance parameters or a particular order of the one or more conformance parameters, but instead may correspond to any individual conformance parameter of the one or more conformance parameters.

Figure 5B:
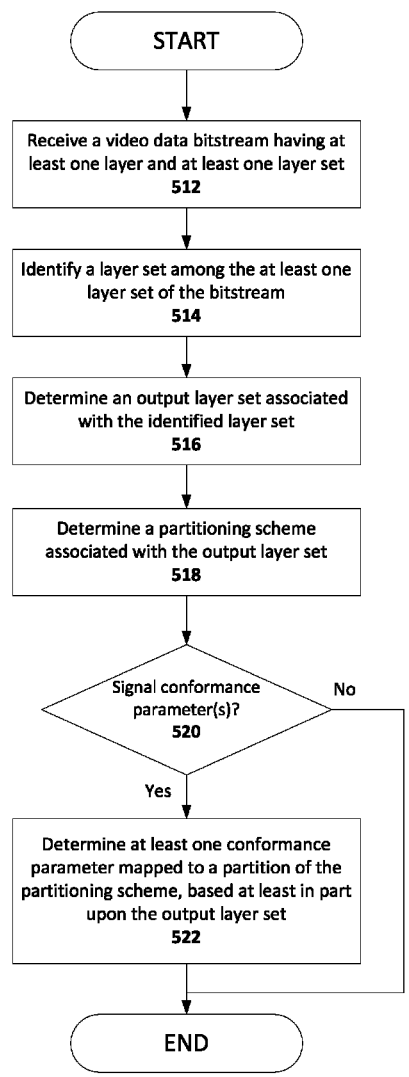
FIG. 5B illustrates a flowchart of a method for decoding video data having mapped HRD parameters, in accordance with aspects described in this disclosure.

FIG. 5B illustrates a flowchart of a method for mapping conformance parameters, such as HRD parameters, in encoded video data, in accordance with aspects described in this disclosure. In some embodiments, the method may be performed by a video decoder, such as the decoders illustrated in FIGS. 3A and 3B. Starting at block 512, a video data bitstream is received having at least one layer and at least one layer set.

At block 514, a layer set among the at least one layer set associated with the bitstream is identified. In some embodiments, the identified layer set corresponds to the layer set that will be used by the decoder in decoding the video data bitstream.

At block 516, an output layer set associated with the identified layer set is determined. In some embodiments, the output layer set corresponds to the output layer set that will be used by the decoder when determining which decoded layers to output for display.

At block 518, a partitioning scheme associated with the output layer set is determined. In some embodiments, the partitioning scheme corresponds to the partitioning scheme in which the video data bitstream was transmitted to the decoder.

At block 520, a determination may be made as to whether one or more conformance parameters (e.g., HRD parameters) were signaled as part of the received video data bitstream. At block 522, in response to a determination that at least one conformance parameter has been signaled as part of the received video data bitstream, at least one conformance parameter mapped to a partition of the partitioning scheme is determined. In some embodiments, the determined conformance parameters may be used to decode the video data bitstream and/or test the video data bitstream for conformance.

Signaling the Default Partitioning Scheme

In order to signal the partitioning schemes and partitions of the output layer set to the receiving decoder, the bitstream will include a number of bits that specify the partitioning scheme(s) and partition(s) that are associated with the output layer set. In some embodiments, the number of bits used to signal the partitioning scheme may be based at least in part upon a number of possible partitioning schemes that may be associated with the output layer set.

In some embodiments, every output layer set is associated with a default partitioning scheme and zero or more additional partitioning schemes. The default partitioning scheme may comprise a partitioning scheme where each layer in the video data is a separate bitstream partition. In some embodiments, it would be common for bitstreams that contain a small number of layers, such as two or three layers, to only be associated with the default partitioning scheme. Because the default partitioning scheme is generally known by both the encoders and decoders, it does not need to be specifically specified in the bitstream. It would thus be beneficial to reduce the number of bits needed to specify the partitioning schemes and partitions associated with an output layer set, when the bitstream is only associated with the default partitioning scheme. For example, in some embodiments, when an output layer set is only associated with the default partitioning scheme, only a single bit flag needs to be signals, without needing to use additional bits to specify the partitioning scheme.

It is understood that while the present disclosure refers to a partitioning scheme where each layer has its own partition as the default partitioning scheme, in other embodiments, a different partitioning scheme may be the default partitioning scheme.

Figure 6:
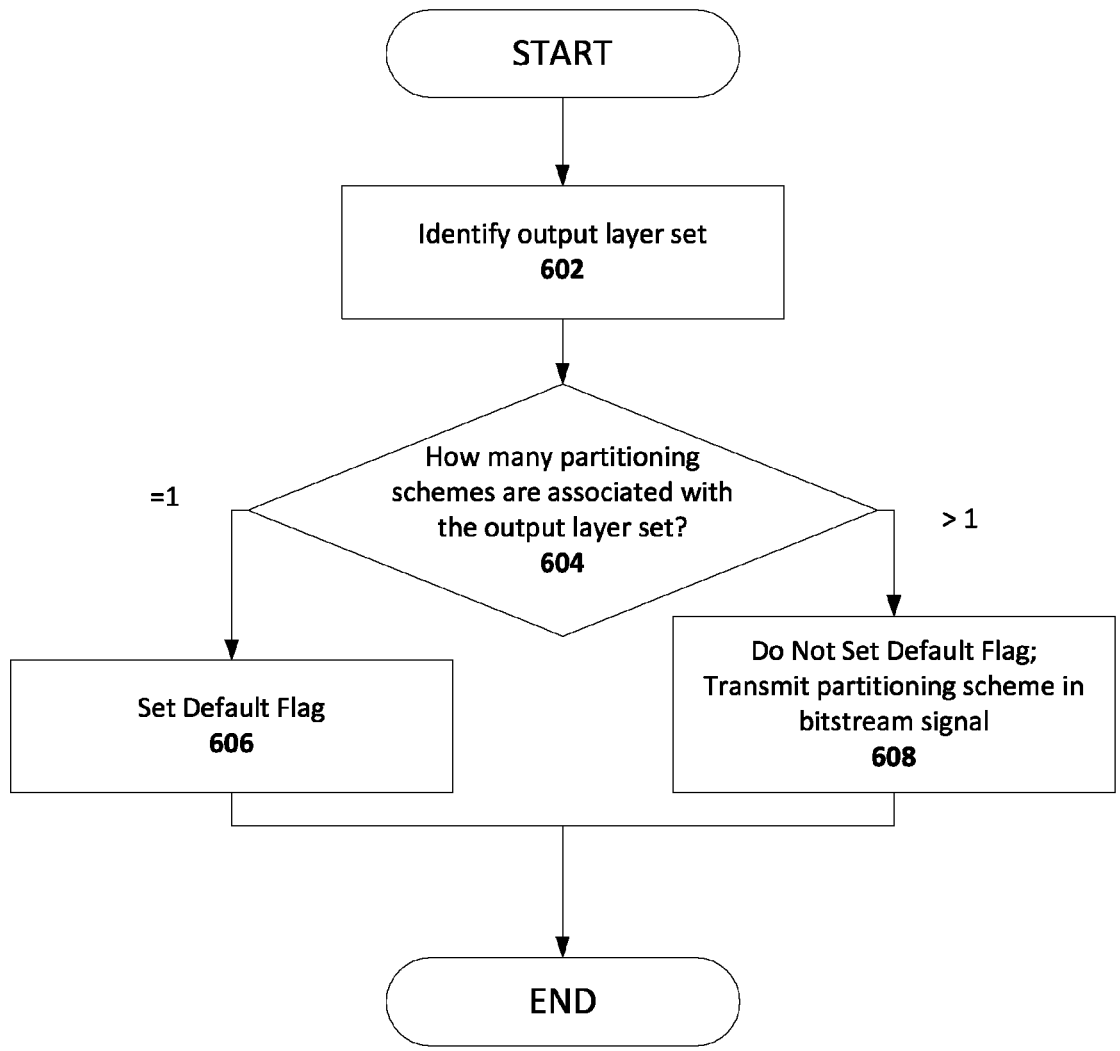
FIG. 6 illustrates a flowchart of a process for signaling a partitioning scheme, in accordance with aspects described in this disclosure.

FIG. 6 illustrates a flowchart of a process for signaling a partitioning scheme, in accordance with aspects described in this disclosure. Starting at block 602, an output layer set is identified. At block 604, a determination is made as to how many partitioning schemes are associated with the identified output layer set.

As stated above, an output layer set may be associated with the default partitioning scheme and zero or more additional partitioning schemes. Thus, if it is determined that there is only one partitioning scheme associated with the output layer set, that partitioning scheme must be the default partitioning scheme. At block 606, a single bit flag is signaled, indicating that the identified output layer set is only associated with the default partitioning scheme. Because the decoder will be able to understand the default partitioning scheme, no additional bits need to be sent in the bitstream to specify the partitioning scheme.

On the other hand, if it is determined that the output layer set is associated with more than one partitioning scheme, then at block 608, the single bit flag is not signaled, indicating that the identified output layer set is associated with more than just the default partitioning scheme. In addition, bits specifying the additional partitioning scheme will be transmitted in the bitstream.

Thus, by implementing a single bit flag to specify whether an output layer set is only associated with the default partitioning scheme, the number of bits needed to indicate the partitioning scheme may be greatly reduced.

Mapping HRD Parameters from Base VPS and VPS VUI Data Structures

In some embodiments, the HRD parameters to be mapped to the partitions, output layer sets, and layer sets are contained in one or more VPS data structures. In some embodiments, the VPS data structures include a base VPS. For example, video data bitstreams in conformance with HEVC or HEVC extensions (e.g., SHVC, MV-HEVC, and/or the like) will typically always contain a base VPS data structure. In addition, in some embodiments, the VPS data structures may also include a video usability information (VUI) parameter set, which may be referred to as VPS VUI. In some embodiments, the partitions and/or partitioning schemes associated with an output layer set may be defined or signaled in the VPS VUI. In some embodiments, in order for an HRD parameter associated with the base VPS to be usable by a partition associated with an output layer set as defined by the VPS VUI, the HRD parameter needs to be accessible by a parameter in the VPS VUI. For example, a bitstream partition (BSP) HRD index parameter (bsp_hrd_idx parameter) associated with the VPS VUI may be used assign HRD parameters to be partition specific, instead of only being layer set specific.

Figure 7:
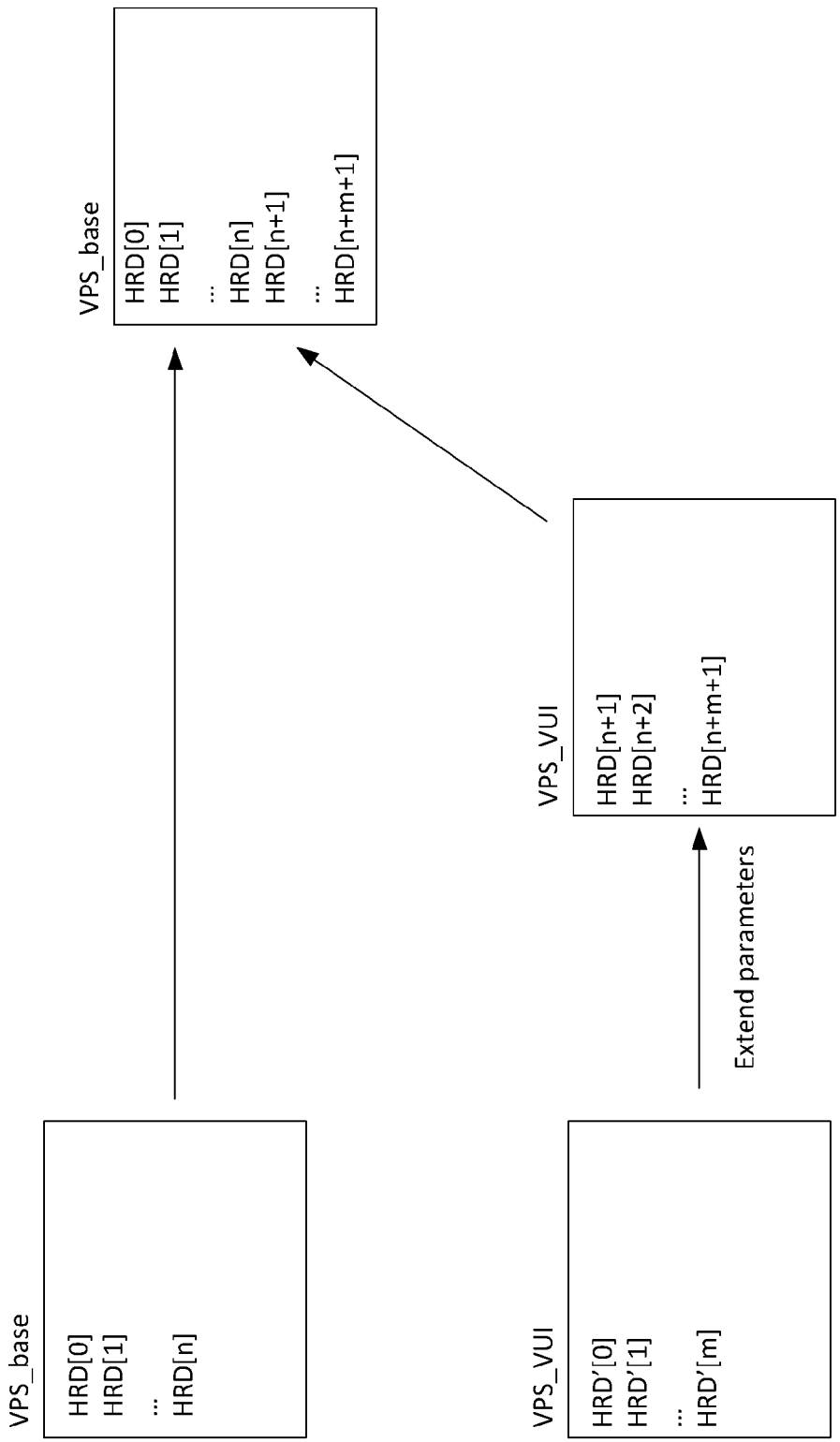
FIG. 7 illustrates extending HRD parameters in the VPS_VUI such that the HRD parameters may be mapped through a single data structure associated with the base VPS, in accordance with aspects described in this disclosure.

One or more HRD parameters are contained within an HRD parameter structure in the base VPS. In addition, one or more additional HRD parameters may be contained within a different HRD parameter structure in the VPS VUI. FIG. 7 illustrates extending HRD parameters in the VPS_VUI such that the HRD parameters may be mapped through a single data structure associated with the base VPS, in accordance with aspects described in this disclosure. As illustrated in FIG. 7, the base VPS contains a data structure having n HRD parameters (HRD[0], HRD[1], . . . HRD[n]). In addition, the VPS VUI contains a data structure having m additional HRD parameters (HRD'[0], HRD'[1], . . . HRD'[m]).

In some embodiments, in order to map the HRD parameters in the base VPS and VPS VUI data structures, the HRD parameters of the VPS VUI (HRD'[0], HRD'[1], . . . HRD'[m]) are extended based at least in part upon the parameters of the base VPS structure. For example, the parameters in the VPS VUI may be extended to become additional parameters of the base VPS structure (HRD[n+1], HRD[n+2], . . . HRD[n+m+1]), allowing them to be appended to the base VPS data structure. Such extension allows for the mapping of HRD parameters to bitstream partitions and output layers sets to be done from a single base VPS data structure, instead of from separate base VPS and VPS VUI structures.

By extending the HRD parameters of the VPS VUI to have continuous indices with those of the base VPS, both HRD parameters associated with the base VPS and those associated with the VPS VUI can be referred to by syntax elements in the VPS VUI. For example, if the HRD parameters of the VPS VUI are not extended, syntax element of the VPS VUI (e.g., the bsp_hrd_idx parameter) can be used to refer to HRD parameters of the VPS VUI, but not HRD parameters of the base VPS (e.g., the bsp_hrd_idx parameter having a value of 0 would refer to the HRD'[0] of the VPS VUI, and not HRD[0] of the base VPS). If any HRD parameters associated with the base VPS are to be able to be referred to be syntax elements of the VPS VUI, they would have to be repeated and re-signaled in the VPS VUI.

However, by extending the HRD parameters of the VPS VUI such that the HRD parameters of the base VPS and VPS VUI have continuous indices, syntax elements of the VPS VUI can be used to refer to HRD parameters associated with either the base VPS or the VPS VUI. For example, the bsp_hrd_idx parameter having a value of 0 would refer to HRD[0] of the base VPS, while the bsp_hrd_idx parameter having a value of n+1 would refer to HRD[n+1] of the VPS VUI. Thus, HRD parameters of the base VPS can be referred to by VPS VUI syntax elements without needing to be repeated in the VPS VUI.

SEI Messages

Figure 8:
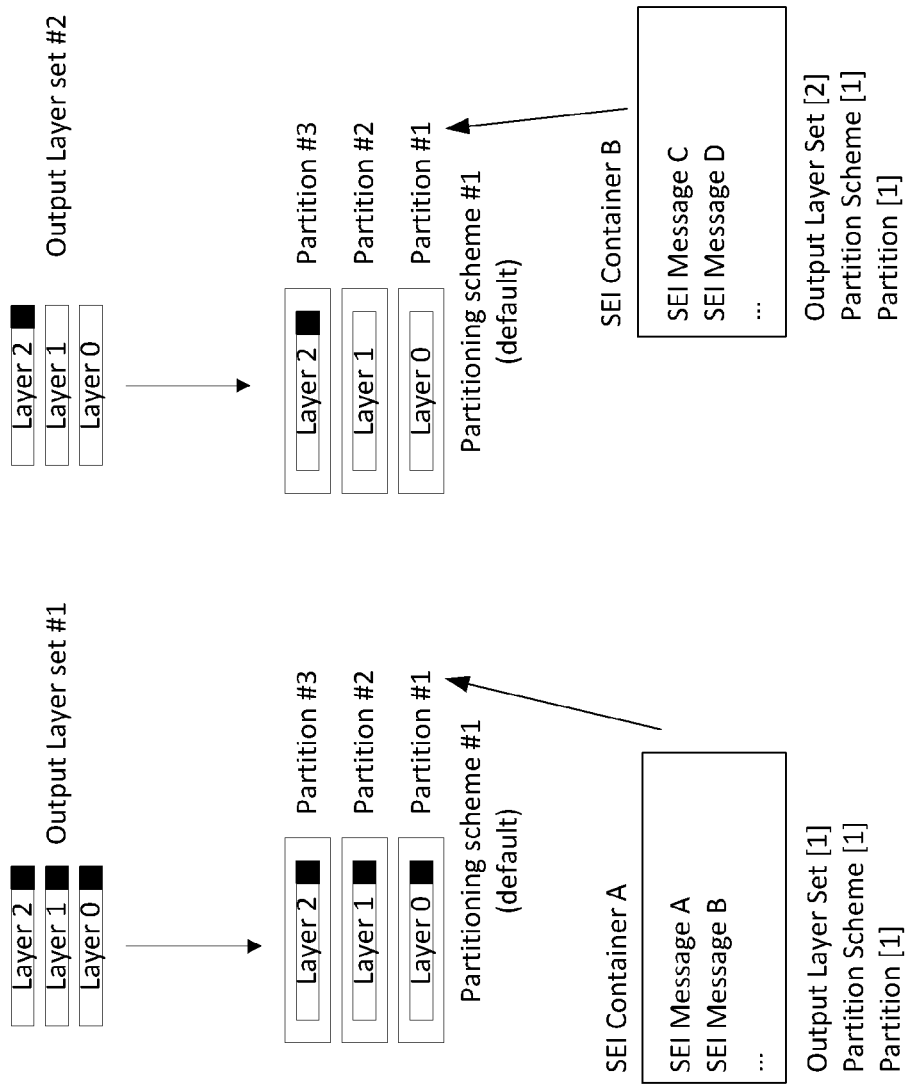
FIG. 8 illustrates how SEI messages may be mapped to partitions, in accordance with aspects described in this disclosure.

In some embodiments, supplemental Enhancement Information (SEI) messages may provide additional information that is associated to partitions of the video data bitstream. For example, SEI messages may include bit rate information, picture rate information, and/or the like. FIG. 8 illustrates how SEI messages may be mapped to partitions, in accordance with aspects described in this disclosure.

In some embodiments, the video data bitstream may contain one or more SEI message containers (may also be referred to as a nesting SEI message), wherein one or more SEI messages are contained or nested within each SEI message container. For example, FIG. 8 illustrates a first SEI Container A that contains SEI Messages A and B, and a second SEI Container B containing SEI Messages C and D.

Typically, an SEI Container signals a partition that it, as well as all the SEI Messages contained within the Container, is associated with. For example, as illustrated in FIG. 8, SEI Container A is mapped to Partition #1 of the default partitioning scheme. However, the same partitioning scheme may be associated with different output layer sets (e.g., the default partitioning scheme may be associated with both output layer set #1 and output layer set #2). Only mapping the SEI Container to a partition/partitioning scheme does not take into account the output layer set that the partition/partitioning scheme is associated with. Therefore, in some embodiments, in addition to signaling a partition, the SEI container will also signal an output layer set that is associated with the partition.

In some embodiments, each output layer set and partitioning scheme is associated with an index value. In order to signal the output layer set and partition that an SEI Container is associated with, the SEI Container may signal the index values of the output layer set and/or partitioning scheme.

As such, by mapping the SEI containers to a particular output layer set index and a partitioning scheme index, the same partitions that are associated with different output layer sets may be associated with different SEI containers and SEI messages.

HEVC Standard

As discussed above, the systems and methods disclosed herein may be applied to the HEVC standard. In accordance with some embodiments, the syntax and semantics of the HEVC standard may be modified as described below.

Testing Bitstream Conformance

Multiple tests may be used to check the conformance of a bitstream, which is referred to as the bitstream under test. For each test, the following steps may apply in the order listed:

An output operation point under test, denoted as TargetOp, may be selected by selecting a value for TargetOlsIdx identifying a target OLS and selecting a target highest TemporalId value HighestTid. The value of TargetOlsIdx shall be in the range of 0 to NumOutputLayerSets−1, inclusive. The value of HighestTid shall be in the range of 0 to MaxSubLayersInLayerSetMinus1[OlsIdxToLsIdx[TargetOlsIdx]], inclusive. The variables TargetDecLayerSetIdx, TargetOptLayerIdList, and TargetDecLayerIdList are then derived as specified by Equation 8 1 of MV-HEVC draft JCT3V-H1002-v5. The output operation point under test has OptLayerIdList equal to TargetOptLayerIdList, OpLayerIdList equal to TargetDecLayerIdList, and OpTid equal to HighestTid.

The sub-bitstream extraction process as specified in clause 10 of MV-HEVC draft JCT3V-H1002-v5 may be invoked with the bitstream under test, HighestTid, and TargetDecLayerIdList as inputs, and the output is assigned to BitstreamToDecode. A partitioning scheme is selected from the list of partitioning schemes signalled in the active VPS for the selected OLS. The selected selected partitioning scheme is denoted as TargetPartitioningScheme.

If there is only one bitstream partition for TargetPartitioningScheme, the bitstream-specific CPB operation may be tested. Otherwise, the bitstream-partition-specific CPB operation may be tested. The subsequent steps apply to each bitstream partition, referred to as the bitstream partition under test TargetBitstreamPartition, of the selected partitioning scheme of the target OLS. If there is only one bitstream partition for TargetPartitioningScheme, the TargetBitstreamPartition is identical to BitstreamToDecode. Otherwise, each the bitstream partitions is derived with the demultiplexing process for deriving a bitstream partition in subclause C.6 of MV-HEVC draft JCT3V-H1002-v5, with BitstreamToDecode, the list of layers in TargetBitstreamPartition, and the number of layers in TargetBitstreamPartition as inputs.

The hrd_parameters( ) syntax structure and the sub_layer_hrd_parameters( ) syntax structure applicable to TargetOp may be selected as follows:

If the bitstream-specific CPB operation is tested and TargetDecLayerIdList contains all nuh_layer_id values present in the bitstream under test, the hrd_parameters( ) syntax structure in the active SPS for the base layer (or provided via an external approach) is selected.

Otherwise, the hrd_parameters( ) syntax structure in the active VPS (or provided via an external approach) that applies to TargetOp, TargetPartitioningScheme, and TargetBitstreamPartition is selected.

Within the selected hrd_parameters( ) syntax structure, if TargetBitstreamPartition is a Type I bitstream, the sub_layer_hrd_parameters(HighestTid) syntax structure that immediately follows the condition "if (vcl_hrd_parameters_present_flag)" is selected and the variable NalHrdModeFlag is set equal to 0; otherwise, (TargetBitstreamPartition is a Type II bitstream), the sub_layer_hrd_parameters(HighestTid) syntax structure that immediately follows either the condition "if (vcl_hrd_parameters_present_flag)" (in this case the variable NalHrdModeFlag is set equal to 0) or the condition "if (nal_hrd_parameters_present_flag)" (in this case the variable NalHrdModeFlag is set equal to 1) is selected. When TargetBitstreamPartition is a Type II bitstream and NalHrdModeFlag is equal to 0, all non-VCL NAL units except filler data NAL units, and all leading_zero_8bits, zero_byte, start_code_prefix_one_3bytes, and trailing_zero_8bits syntax elements that form a byte stream from the NAL unit stream, when present, are discarded from TargetBitstreamPartition, and the remaining bitstream is assigned to TargetBitstreamPartition.

An access unit associated with a buffering period SEI message (present in BitstreamToDecode or available via an external approach) applicable to TargetOp, TargetPartitioningScheme, and TargetBitstreamPartition may be selected as the HRD initialization point and referred to as access unit 0. An applicable buffering period SEI message is available via an external approach or is selected from access unit 0 as follows:

If the bitstream-specific CPB operation is tested and TargetDecLayerIdList contains all nuh_layer_id values present in the bitstream under test, the non-nested buffering period SEI message is selected.

Otherwise, the buffering period SEI message applicable to TargetOp, TargetPartitioningScheme, and TargetBitstreamPartition is selected.

The variable MultiLayerCpbOperationFlag may be derived as follows—if the selected buffering period SEI message is non-nested or BitstreamToDecode contains only the base layer, MultiLayerCpbOperationFlag is set equal to 0. Otherwise, MultiLayerCpbOperationFlag is set equal to 1.

For each access unit in TargetBitstreamPartition starting from access unit 0, the buffering period SEI message (present in BitstreamToDecode or available via an external approach) that is associated with the access unit and applies to TargetOp, TargetPartitioningScheme, and TargetBitstreamPartition is selected, the picture timing SEI message (present in BitstreamToDecode or available via an external approach) that is associated with the access unit and applies to TargetOp, TargetPartitioningScheme, and TargetBitstreamPartition is selected, and when SubPicHrdFlag is equal to 1 and sub_pic_cpb_params_in_pic_timing_sei_flag is equal to 0, the decoding unit information SEI messages (present in BitstreamToDecode or available via an external approach) that are associated with decoding units in the access unit and apply to TargetOp, TargetPartitioningScheme, and TargetBitstreamPartition are selected as follows:

If the bitstream-specific CPB operation is tested and TargetDecLayerIdList contains all nuh_layer_id values present in the bitstream under test, non-nested buffering period, picture timing, and decoding unit information SEI messages are selected.

Otherwise, the buffering period, picture timing, and decoding unit information SEI messages either directly included in the scalable nesting SEI message or directly included in the bitstream partition nesting SEI message and applicable to TargetOp, TargetPartitioningScheme, and TargetBitstreamPartition are selected.

A value of SchedSelIdx may be selected as follows:

If the bitstream-specific CPB operation is tested, the selected SchedSelIdx shall be in the range of 0 to cpb_cnt_minus1[HighestTid], inclusive, where cpb_cnt_minus1[HighestTid] is found in the sub_layer_hrd_parameters(HighestTid) syntax structure as selected above.

Otherwise (the bitstream-partition-specific CPB operation is tested), a SchedSelCombIdx is selected for BitstreamToDecode and used for each TargetBitstreamPartition. The selected SchedSelCombIdx shall be in the range of 0 to num_bsp_sched_combinations_minus1[TargetOlsIdx][TargetPartitioningScheme], inclusive. The selected SchedSelIdx for TargetBitstreamPartition is set equal to bsp_comb_sched_idx[TargetOlsIdx][TargetPartitioningScheme][SchedSelCombIdx][j], where j is the index of the bitstream partition index of TargetBitstreamPartition.

The variable initialAltParamSelectionFlag may be derived as follows:

If all of the following conditions are true, initialAltParamSelectionFlag is set equal to 1:
  (a) The coded picture with nuh_layer_id equal to 0 in access unit 0 has nal_unit_type equal to CRA_NUT or BLA_W_LP.
  (b) MultiLayerCpbOperationFlag is equal to 0.
  (c) irap_cpb_params_present_flag in the selected buffering period SEI message is equal to 1.

Otherwise, if all of the following conditions are true, initialAltParamSelectionFlag is set equal to 1:
  (a) The coded picture with nuh_layer_id equal to 0 in access unit 0 is an IRAP picture.
  (b) MultiLayerCpbOperationFlag is equal to 1.
  (c) irap_cpb_params_present_flag in the selected buffering period SEI message is equal to 1.

Otherwise, initialAltParamSelectionFlag is set equal to 0.

When initialAltParamSelectionFlag is equal to 1, the following applies:
  (a) If the selected buffering period SEI message is either directly included in a scalable nesting SEI message or directly included in the bitstream partition nesting SEI message and applicable at least to one sub-bitstream that contains more than one layer, a set of skipped leading pictures skippedPictureList includes the CL-RAS pictures and the RASL pictures associated with the IRAP pictures with nuh_layer_id equal to nuhLayerId for which LayerInitializedFlag[nuhLayerId] is equal to 0 at the start of decoding the IRAP picture and for which nuhLayerId is among TargetDecLayerIdList. Otherwise (a buffering period SEI message is not nested in a scalable nesting SEI message), skippedPictureList includes the RASL pictures associated with the coded picture with nuh_layer_id equal to 0 in access unit 0.
  (b) Either of the following applies for selection of the initial CPB removal delay and delay offset:
    (i) If NalHrdModeFlag is equal to 1, the default initial CPB removal delay and delay offset represented by nal_initial_cpb_removal_delay[SchedSelIdx] and nal_initial_cpb_removal_offset[SchedSelIdx], respectively, in the selected buffering period SEI message are selected. Otherwise, the default initial CPB removal delay and delay offset represented by vcl_initial_cpb_removal_delay[SchedSelIdx] and vcl_initial_cpb_removal_offset[SchedSelIdx], respectively, in the selected buffering period SEI message are selected. The variable DefaultInitCpbParamsFlag is set equal to 1.
    (ii) If NalHrdModeFlag is equal to 1, the alternative initial CPB removal delay and delay offset represented by nal_initial_alt_cpb_removal_delay[SchedSelIdx] and nal_initial_alt_cpb_removal_offset[SchedSelIdx], respectively, in the selected buffering period SEI message are selected. Otherwise, the alternative initial CPB removal delay and delay offset represented by vcl_initial_alt_cpb_removal_delay[SchedSelIdx] and vcl_initial_alt_cpb_removal_offset[SchedSelIdx], respectively, in the selected buffering period SEI message are selected. The variable DefaultInitCpbParamsFlag is set equal to 0, and all the pictures in skippedPictureList are discarded from BitstreamToDecode and the remaining bitstream is assigned to BitstreamToDecode.

For the bitstream-partition-specific CPB operation, SubPicHrdFlag may be set equal to 1. For the bitstream-specific CPB operation, when sub_pic_hrd_params_present_flag in the selected hrd_parameters( ) syntax structure is equal to 1, the CPB is scheduled to operate either at the access unit level (in which case the variable SubPicHrdFlag is set equal to 0) or at the sub-picture level (in which case the variable SubPicHrdFlag is set equal to 1).

In one implementation, the HRD may operate in accordance with one or more of the following aspects:

The HRD may be initialized at decoding unit 0, with the CPB, each sub-DPB of the DPB, and each BPB being set to be empty (the sub-DPB fullness for each sub-DPB is set equal to 0). It is noted that, after initialization, the HRD may not be initialized again by subsequent buffering period SEI messages.

For the bitstream-specific CPB operation, data associated with decoding units that flow into the CPB according to a specified arrival schedule are delivered by the HSS. For the bitstream-partition-specific CPB operation, data associated with decoding units that flow into the BPB according to a specified arrival schedule are delivered by an HBPS.

When the bitstream-partition-specific CPB operation is used, each bitstream partition with index j is processed as specified in subclause C.2 of MV-HEVC draft JCT3V-H1002-v5 with the HSS replaced by the HBPS and with SchedSelIdx equal to bsp_comb_sched_idx[TargetOlsIdx][TargetPartitioningScheme][SchedSelCombIdx][j].

The data associated with each decoding unit may be removed and decoded instantaneously by the instantaneous decoding process at the CPB removal time of the decoding unit.

Each decoded picture may be placed in the DPB.

A decoded picture may be removed from the DPB when it becomes no longer needed for inter prediction reference and no longer needed for output.

Bitstream Conformance

A bitstream of coded data conforming to MV-HEVC draft JCT3V-H1002-v5 may be constructed with syntax, semantics, and constraints consistent with the following.

The first access unit in a bitstream shall be an IRAP access unit.

When vps_base_layer_internal_flag is equal to 0, the following bitstream conformance constraints apply without considering pictures with nuh_layer_id equal to 0, for which there is no coded picture in the bitstream and the decoded pictures are provided via an external approach.

Let currPicLayerId be equal to the nuh_layer_id of the current picture.

For each current picture, let the variables maxPicOrderCnt and minPicOrderCnt be set equal to the maximum and the minimum, respectively, of the PicOrderCntVal values of the following pictures with nuh_layer_id equal to currPicLayerId:

(a) The current picture.
(b) The previous picture in decoding order that has TemporalId equal to 0 and that is not a RASL picture, a RADL picture, or a sub-layer non-reference picture.
(c) The short-term reference pictures in the RPS of the current picture.
(d) All pictures n that have PicOutputFlag equal to 1, AuCpbRemovalTime[n] less than AuCpbRemovalTime[currPic], and DpbOutputTime[n] greater than or equal to AuCpbRemovalTime[currPic], where currPic is the current picture.

The sub-bitstream of each bitstream partition of each partitioning scheme is tested by the HRD for conformance as specified in subclause C.1 of MV-HEVC draft JCT3V-H1002-v5.

HRD Parameters Semantics

The specifications in clause E.3.2 of MV-HEVC draft JCT3V-H1002-v5 apply with the following modifications and additions.

In one aspect, initial_cpb_removal_delay_length_minus1 plus 1 specifies the length, in bits, of the nal_initial_cpb_removal_delay[i], nal_initial_cpb_removal_offset[i], vcl_initial_cpb_removal_delay[i], and vcl_initial_cpb_removal_offset[i] syntax elements of the buffering period SEI message. Additionally, initial_cpb_removal_delay_length_minus1 plus 1 within the j-th hrd_parameters( ) syntax structure in the VPS specifies the length, in bits, of the nal_initial_arrival_delay[k] and vcl_initial_arrival_delay[k] syntax elements of the bitstream partition initial arrival time SEI message that is contained in a bitstream partition nesting SEI message within a scalable nesting SEI message with values of sei_ols_idx, sei_partitioning_scheme_idx, and bsp_idx such that bsp_comb_hrd_idx[sei_ols_idx][sei_partitioning_scheme_idx][k][bsp_idx] is equal to j. When the initial_cpb_removal_delay_length_minus1 syntax element is not present, it is inferred to be equal to 23.

Changes to Video Parameter Set (VPS) Syntax

The changes to the syntax, semantics, and decoding process are highlighted below: additions are shown in italics and deletions are shown in [[double brackets]]. Table 1 illustrates the changes to the vps_extension( ) syntax:

TABLE 1

EXAMPLE SYNTAX OF VPS_EXTENSION( )

| | Descriptor |
|---|---|
| vps_extension( ) { | |
|   ... | u(1) |
|   NumOutputLayerSets = num_add_olss + NumLayerSets | |
|   for( i = 1; i < NumOutputLayerSets; i++ ) { | |
|     if( i >= NumLayerSets ) | |
|       layer_set_idx_for_ols_minus1[ i ] | u(v) |
|     if( i > vps_num_layer_sets_minus1 \|\| | |
|       defaultOutputLayerIdc = = 2 ) | |
|       for( j = 0; j < NumLayersInIdList[ | |
|       OlsIdxToLsIdx[ i ] ]; j++) | |
|         output_layer_flag[ i ][ j ] | u(1) |
|     num_signalled_partitioning_schemes[ i ] | ue(v) |
|     for( j = 0; j < NumPartitioningSchemes[ i ]; j++ ) { | |
|       if( num_signalled_partitioning_schemes[ i ] > 0 ) | |
|         num_partitions_in_scheme_minus1[ i ][ j ] | ue(v) |
|       for( k = 0; k <= | |
|       num_partitions_in_scheme_minus1[ i ][ j ]; k++ ) | |
|       { | |
|         if( num_signalled_partitioning_schemes[ i ] > 0 ) | |
|           for( r = 0; r < NumLayersInIdList[ | |

TABLE 1-continued

EXAMPLE SYNTAX OF VPS_EXTENSION( )

| | Descriptor |
|---|---|
| OlsIdxToLsIdx[ i ] ]; r++ ) | |
|     layer_included_in_partition_flag[ i ][ j ][ k ][ r ] | u(1) |
|     profile_tier_level_idx[ i ][ j ][ k ] | u(v) |
|   } | |
| } | |
| if( NumOutputLayersInOutputLayerSet[ i ] = = 1 && NumDirectRefLayers[ OlsHighestOutputLayerId[ i ] ] > 0 ) | |
|   alt_output_layer_flag[ i ] | u(1) |
| ... | |
| } | |

Changes to VPS VUI Bitstream Partition HRD Parameters Syntax

Table 2 illustrates the changes to the vps_vui_bsp_hrd_parameters( ) syntax:

TABLE 2

EXAMPLE SYNTAX OF VPS_VUI_BSP_HRD_PARAMETERS( )

| | Descriptor |
|---|---|
| vps_vui_bsp_hrd_parameters( ) { | |
|   vps_num_add_hrd_parameters | ue(v) |
|   for( i = vps_num_hrd_parameters; i < vps_num_hrd_parameters + vps_num_add_hrd_parameters; i++ ) { | |
|     if( i > 0 ) | |
|       cprms_add_present_flag[ i ] | u(1) |
|     hrd_parameters( cprms_add_present_flag[ i ], vps_max_sub_layers_minus1 ) | |
|   } | |
|   for( h = 1; h < NumOutputLayerSets; h++ ) | |
|     for( i = 0; i < NumPartitioningSchemes[ h ]; i++ ) { | |
|       bsp_hrd_parameters_present_flag[ h ][ i ] | u(1) |
|       if( bsp_hrd_parameters_present_flag[ h ][ i ] ) { | |
|         num_bsp_sched_combinations_minus1[ h ][ i ] | ue(v) |
|         for( j = 0; j <= num_bsp_sched_combinations_minus1[ h ][ i ]; j++ ) | |
|           for( k = 0; k <= num_partitions_in_scheme_minus1[ h ][ i ]; k++ ) { | |
|             bsp_comb_hrd_idx[ h ][ i ][ j ][ k ] | u(v) |
|             bsp_comb_sched_idx[ h ][ i ][ j ][ k ] | ue(v) |
|           } | |
|       } | |
|     } | |
| } | |

Video Parameter Set Semantics num_signalled_partitioning_schemes[i] specifies the number of signalled partitioning schemes for the i-th OLS. The value of num_signalled_partitioning_schemes[i] shall be in the range of 0 to 16, inclusive. When vps_base_layer_internal_flag is equal to 1, the value of num_signalled_partitioning_schemes[0] is inferred to be equal to 0.

The variable NumPartitioningSchemes[i] is set equal to (num_signalled_partitioning_schemes[i]==0) ?1:num_signalled_partitioning_schemes[i].

num_partitions_in_scheme_minus1[i][j] plus 1 specifies the number of bitstream partitions for the j-th partitioning scheme of the i-th OLS. The value of num_partitions_in_scheme_minus1[i][j] shall be in the range of 0 to NumLayersInIdList[OlsIdxToLsIdx[i]]−1, inclusive. When vps_base_layer_internal_flag is equal to 1, the value of num_partitions_in_scheme_minus1[0][0] is inferred to be equal to 0. When num_signalled_partitioning_schemes[i] is equal to 0, the value of num_partitions_in_scheme_minus1[i][j] is inferred to be equal to NumLayersInIdList[i]−1.

layer_included_in_partition_flag[i][j][k][r] equal to 1 specifies that the r-th layer in the i-th OLS is included in the k-th bitstream partition of the j-th partitioning scheme of the i-th OLS. layer_included_in_partition_flag[i][j][k][r] equal to 0 specifies that the r-th layer in the i-th OLS is not included in the k-th bitstream partition of the j-th partitioning scheme of the i-th OLS. When vps_base_layer_internal_flag is equal to 1, the value of layer_included_in_partition_flag[0][0][0][0] is inferred to be equal to 1. When num_signalled_partitioning_schemes[i] is equal to 0, the value of layer_included_in_partition_flag[i][j][k][r] is inferred to be equal to 1 if k is equal to r and 0 otherwise. It is a requirement of bitstream conformance that the following constraints apply:

(a) For the j-th partitioning scheme of the i-th OLS, the bitstream partition with index k1 shall not include direct or indirect reference layers of any layers in the bitstream partition with index k2 for any values of k1 and k2 in the range of 0 to num_partitions_in_scheme_minus1[i][j], inclusive, such that k2 is less than k1.

(b) When vps_base_layer_internal_flag is equal to 0 and layer_included_in_partition_flag[i][j][k][0] is equal to 1 for any value of i in the range of 1 to NumOutputLayerSets−1, inclusive, any value of j in the range of 0 to NumPartitioningSchemes[i]−1, inclusive, and any value of k in the range of 0 to num_partitions_in_scheme_minus1[i][j], inclusive, the value of layer_included_in_partition_flag[i][j][k][r] for at least one value of r in the range of 1 to NumLayersInIdList[OlsIdxToLsIdx[i]]−1, inclusive, shall be equal to 1.

(c) For each partitioning scheme with index j of the i-th OLS, and for each layer with nuh_layer_id equal to currLayerId in the i-th OLS, there exists one and only one value of k in the range of 0 to num_partitions_in_scheme_minus1[i][j], inclusive, such that layer_included_in_partition_flag[i][j][k][LayerIdxInVps[currLayerId]] is equal to 1.

profile_tier_level_idx[i][j][k] specifies the index, into the list of profile_tier_level( ) syntax structures in the VPS, of the profile_tier_level( ) syntax structure that applies to the k-th bitstream partition of the j-th partitioning scheme of the i-th OLS. When num_add_layer_sets is greater than 0 and OlsIdxToLsIdx[i] is in the range of FirstAddLayerSetIdx to LastAddLayerSetIdx, inclusive, the i-th OLS refers to the output of the non-base layer subtree extraction process of subclause F.10.2 of MV-HEVC draft JCT3V-H1002-v5 with the input variable lsIdx set equal to OlsIdxToLsIdx[i], where the active VPSs of the output bitstream outBitstream, if any, shall contain an OLS specifying the output of the same layers as the i-th OLS of the current VPS. The length of the profile_tier_level_idx[i][j][k] syntax element is Ceil(Log 2(vps_num_profile_tier_level_minus1+1)) bits. When vps_base_layer_internal_flag is equal to 1, the value of profile_tier_level_idx[0][0][0] is inferred to be equal to 0. The value of profile_tier_level_idx[i][j][k] shall be in the range of (vps_base_layer_internal_flag ? 0:1) to vps_num_profile_tier_level minus1, inclusive.

VPS VUI Bitstream Partition HRD Parameters Semantics vps_num_add_hrd_parameters specifies the number of additional hrd_parameters( ) syntax structures present in the VPS. The value of vps_num_add_hrd_parameters shall be in the range of 0 to 1024—vps_num_hrd_parameters, inclusive.

cprms_add_present_flag[i] equal to 1 specifies that the HRD parameters that are common for all sub-layers are present in the i-th hrd_parameters( ) syntax structure. cprms_add_present_flag[i] equal to 0 specifies that the HRD parameters that are common for all sub-layers are not present in the i-th hrd_parameters( ) syntax structure and are derived to be the same as the (i−1)-th hrd_parameters( ) syntax structure.

bsp_hrd_parameters_present_flag[h][i] equal to 1 specifies that the HRD parameters are present for all bitstream partitions of the i-th partitioning schemes of the h-th OLS. bsp_hrd_parameters_present_flag[h][i] equal to 0 specifies that the HRD parameters are not present for any bitstream partition of the i-th partitioning scheme of the h-th OLS.

num_bsp_sched_combinations_minus1[h][i] plus 1 specifies the number of combinations of delivery schedules and hrd_parameters( ) specified for bitstream partitions of the i-th partitioning scheme of the h-th OLS.

The variable SchedCombCnt[h][i] is set equal to num_bsp_sched_combinations_minus1[h][i]+1.

bsp_comb_hrd_idx[h][i][j][k] specifies the index of the hrd_parameters( ) syntax structure in the VPS for the j-th combination of a delivery schedule and hrd_parameters( ) specified for the k-th bitstream partition of the i-th partitioning scheme for the h-th OLS. The length of the bsp_comb_hrd_idx[h][i][j][k] syntax element is Ceil(Log 2(vps_num_hrd_parameters+vps_num_add_hrd_parameters)) bits. The value of bsp_comb_hrd_idx[h][i][j][k] shall be in the range of 0 to vps_num_hrd_parameters+vps_num_add_hrd_parameters−1, inclusive.

bsp_comb_sched_idx[h][i][j][k] specifies the index of a delivery schedule within the hrd_parameters( ) syntax structure with the index bsp_comb_hrd_idx[h][i][j][k] that is used in the j-th combination of a delivery schedule and hrd_parameters( ) specified for the k-th bitstream partition of the i-th partitioning scheme for the h-th OLS. The value of bsp_comb_sched_idx[h][i][j][k] shall be in the range of 0 to cpb_cnt_minus1[HighestTid], inclusive, where cpb_cnt_minus1[HighestTid] is found in the sub_layer_hrd_parameters (HighestTid) syntax structure from the hrd_parameters( ) syntax structure corresponding to the index bsp_comb_hrd_idx[h][i][j][k].

Changes to Bitstream Partition Nesting SEI Message Syntax

Table 3 illustrates the changes to the bsp_nesting( ) syntax:

TABLE 3

EXAMPLE SYNTAX OF BSP_NESTING( )

|  | Descriptor |
|---|---|
| bsp_nesting( payloadSize ) { | |
|   sei_ols_idx | ue(v) |
|   sei_partitioning_scheme_idx | ue(v) |
|   bsp_idx | ue(v) |
|   while( !byte_aligned( ) ) | |
|     bsp_nesting_zero_bit /* equal to 0 */ | u(1) |
|   Do | |
|     sei_message( ) | |
|   while( more_rbsp_data( ) ) | |
| } | |

Changes to Bitstream Partition Initial Arrival Time SEI Message Syntax

Table 4 illustrates the changes to the bsp_initial_arrival_time( ) syntax:

TABLE 4

EXAMPLE SYNTAX OF BSP_INITIAL_ARRIVAL_TIME( )

|  | Descriptor |
|---|---|
| bsp_initial_arrival_time( payloadSize ) { | |
|   if( NalHrdBpPresentFlag ) | |
|     for( i = 0; i < SchedCombCnt[ sei_ols_idx ][ sei_partitioning_scheme_idx ]; i++ ) | |
|       nal_initial_arrival_delay[ i ] | u(v) |
|   else | |
|     for( i = 0; i < SchedCombCnt[ sei_ols_idx ][ sei_partitioning_scheme_idx ]; i++ ) | |
|       vcl_initial_arrival_delay[ i ] | u(v) |
| } | |

General Semantics of SEI Messages

The constraints of bitstream conformance specified in clause D.3.1 of MV-HEVC draft JCT3V-H1002-v5 may apply with the following additions.

Let prevVclNalUnitInAu of an SEI NAL unit or an SEI message be the preceding VCL NAL unit in decoding order, if any, in the same access unit, and nextVclNalUnitInAu of an SEI NAL unit or an SEI message be the next VCL NAL unit in decoding order, if any, in the same access unit.

In one example, it is a requirement of bitstream conformance that the following restrictions apply: when a buffering period SEI message, a picture timing SEI message, a decoding unit information SEI message, or a bitstream partition initial arrival time SEI message is present in a bitstream partition nesting SEI message contained in a scalable nesting SEI message, the scalable nesting SEI message shall not follow any other SEI message that follows the prevVclNalUnitInAu of the scalable nesting SEI message and precedes the nextVclNalUnitInAu of the scalable nesting SEI message, other than an active parameter sets SEI message, a non-nested buffering period SEI message, a non-nested picture timing SEI message, a non-nested decoding unit information SEI message, a scalable nesting SEI message including a buffering period SEI message, a picture timing SEI message, a decoding unit information SEI message, or another scalable nesting SEI message that contains a bitstream partition nesting SEI message including a buffering period SEI message, a picture timing SEI message, a decoding unit information SEI message, or a bitstream partition initial arrival time SEI message.

Bitstream Partition Nesting SEI Message Semantics

The bitstream partition nesting SEI message provides a mechanism to associate SEI messages with a bitstream partition of a partitioning scheme of an OLS.

When present, this SEI message shall be contained within a scalable nesting SEI message. When this SEI message is contained in a scalable nesting SEI message, it shall be the only nested SEI message. In the scalable nesting SEI message containing this SEI message, bitstream_subset_flag shall be equal to 1, nesting_op_flag shall be equal to 1, default_op_flag shall be equal to 0, nesting_num_ops_minus1 shall be equal to 0, and nesting_op_idx[0] shall not be equal to 0. The nuh_layer_id of the SEI NAL unit shall be equal to the highest value within the list nestingLayerIdList[0].

A bitstream partition nesting SEI message contains one or more SEI messages.

sei_ols_idx specifies the index of the OLS to which the contained SEI messages apply. The value of sei_ols_idx shall be in the range of 0 to NumOutputLayerSets−1, inclusive.

It is a requirement of bitstream conformance that OlsIdxToLsIdx[sei_ols_idx] shall be equal to nesting_op_idx[0] of the scalable nesting SEI message that contains the bitstream partition nesting SEI message.

sei_partitioning_scheme_idx specifies the index of the partitioning scheme to which the contained SEI messages apply. The value of sei_partitioning_scheme_idx shall be in the range of 0 to NumPartitioningSchemes[sei_ols_idx]−1, inclusive.

bsp_idx specifies the index of the bitstream partition to which the contained SEI messages apply. The value of bsp_idx shall be in the range of 0 to num_partitions_in_scheme_minus1[sei_ols_idx][sei_partitioning_scheme_idx], inclusive.

Bitstream Partition Initial Arrival SEI Message Semantics

The bitstream partition initial arrival time SEI message may specify the initial arrival times to be used in the bitstream-partition-specific CPB operation.

When present, this SEI message shall be contained within a bitstream partition nesting SEI message, and the same bitstream partition nesting SEI message shall also contain a buffering period SEI message.

Let hrdParamIdx[i] for i in the range of 0 to SchedCombCnt[sei_ols_idx][sei_partitioning_scheme_idx], inclusive, be equal to the value of bsp_comb_hrd_idx[olsIdx][partitioningSchemeIdx][i][bspIdx], where olsIdx, partitioningSchemeIdx, and bspIdx are equal to sei_ols_idx, sei_partitioning_scheme_idx, and bsp_idx, respectively, of the bitstream partition nesting SEI message containing this bitstream partition initial arrival time SEI message. Let initialCpbRemovalDelayLength[i] be equal to initial_cpb_removal_delay_length_minus1+1, where initial_cpb_removal_delay_length_minus1 is found in the hrdParamIdx[i]-th hrd_parameters( ) syntax structure in the active VPS.

nal_initial_arrival_delay[i] specifies the initial arrival time for the i-th schedule combination of the bitstream partition to which this SEI message applies, when NAL HRD parameters are in use. The length, in bits, of the nal_initial_arrival_delay[i] syntax element is equal to initialCpbRemovalDelayLength[i].

vcl_initial_arrival_delay[i] specifies the initial arrival time for the i-th schedule combination of the bitstream partition to which this SEI message applies, when VCL HRD parameters are in use. The length, in bits, of the vcl_initial_arrival_delay[i] syntax element is equal to initialCpbRemovalDelayLength[i].

Other Considerations

Information and signals disclosed herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The techniques described herein may be implemented in hardware, software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), flash memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more DSPs, general purpose microprocessors, ASICs, FPGAs, or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software modules or hardware modules configured for encoding and decoding, or incorporated in a combined video encoder-decoder (CODEC). Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of inter-operative hardware units, including one or more processors as described above, in conjunction with suitable software and/or firmware.

Various embodiments of the invention have been described. These and other embodiments are within the scope of the following claims.

What is claimed is:

1. A method operable by a video encoder, comprising:
coding video data to form a bitstream having at least one layer and at least one layer set that specifies the at least one layer of the bitstream that is to be processed by a video decoder;
associating at least one output layer set with each layer set, wherein the output layer set specifies the at least one layer that is to be output by the video decoder, wherein a first output layer set of the at least one output layer set indicates a subset of its associated layer set that is to be output by the video decoder and a second output layer set of the at least one output layer set indicates another subset of the associated layer set that is to be output by the video decoder;
associating at least one partitioning scheme with the first output layer set and with the second output layer set of the at least one output layer set, wherein the at least one partitioning scheme specifies how the at least one layer of the bitstream is to be partitioned for transmission;
performing a determination as to whether to signal conformance parameters as part of the bitstream, based at least in part on the video encoder or one or more encoder configuration settings, wherein the conformance parameters are used to detect a conformance of the bitstream; and
in response to a determination to signal conformance parameters as part of the bitstream, mapping a first conformance parameter to a partition of a partitioning scheme among the at least one partitioning scheme, based at least in part on the first output layer set, and mapping a second conformance parameter to the partition of the partitioning scheme among the at least one partitioning scheme, based at least in part on the second output layer set.

2. The method of claim 1, wherein the first conformance parameter comprises a hypothetical reference decoder (HRD) parameter.

3. The method of claim 1, further comprising performing a determination as to whether or not to signal a conformance parameter prior to mapping the first conformance parameter to the partition.

4. The method of claim 1, further comprising, in response to the first output layer set being associated with only one partitioning scheme, signaling a bit in the bitstream to indicate that the first output layer set is associated with a default partitioning scheme.

5. The method of claim 4, wherein the default partitioning scheme comprises separating each layer of at least one layer into its own partition.

6. The method of claim 1, further comprising:
determining a first index of the first output layer set;
determining a second index of the partitioning scheme associated with the first output layer set;
identifying a nesting supplemental enhancement information (SEI) message, the nesting SEI message comprising at least one nested SEI message; and
defining an association between the at least one nested SEI message and the partitioning scheme based at least in part on the first and second indices.

7. The method of claim 1, wherein the bitstream is associated with a base video parameter set (VPS) and a video usability information (VUI) parameter set, the method further comprising:
determining a first portion of at least one conformance parameter that is signaled in the base VPS;
identifying a second portion of the at least one conformance parameter signaled in the VUI; and
extending the second portion to be accessible via a data structure associated with the base.VPS.

8. The method of claim 7, wherein mapping the first conformance parameter comprises mapping the first portion and the second portion of the at least one conformance parameter to the partition, based on the data structure associated with the base VPS.

9. The method of claim 1, wherein at least one partitioning scheme is associated with each output layer set of the at least one output layer set.

10. A method operable by a video decoder, comprising:
receiving a video data bitstream having at least one layer and at least one layer set that specifies the at least one layer of the video data bitstream that is to be processed by the video decoder;
identifying a layer set among the at least one layer set of the bitstream, the identified layer set indicating a subset of the at least one layer to be decoded;
determining at least one output layer set associated with the identified layer set, wherein the at least one output layer set specifies the at least one layer that is to be output by the video decoder, a first output layer set of the at least one output layer set indicating a subset of the identified layer set that is to be output by the video decoder and a second output layer set of the at least one output layer set indicating another subset of the identified layer set that is to be output by the video decoder; and
determining at least one partitioning scheme associated with the first output layer set and with the second output layer set of the at least one output layer set, wherein the at least one partitioning scheme specifies how the layers of the video data bitstream are to be partitioned for transmission;
wherein the video data bitstream is received as one or more partitions according to the at least one partitioning scheme associated with the output layer set, wherein conformance parameters used to detect a conformance of the video data bitstream are signaled as part of the video data bitstream, wherein a first conformance parameter is mapped to a partition of the partitioning scheme among the at least one partitioning scheme, based at least in part on the first output layer set, and wherein a second conformance parameter is mapped to the partition of the partitioning scheme among the at least one partitioning scheme, based at least in part on the second output layer set.

11. The method of claim 10, wherein the at least one conformance parameter comprises a hypothetical reference decoder (HRD) parameter.

12. The method of claim 10, further comprising determining that the output layer set is only associated with a default partitioning scheme, by checking a bit received in the bitstream indicating that the output layer set is only associated with a default partitioning scheme.

13. The method of claim 10, further comprising:
identifying an index associated with the output layer set;
identifying an index associated with the partitioning scheme associated with the output layer set;
identifying a nesting supplemental enhancement information (SEI) message, the nesting SEI message comprising one or more contained SEI messages; and
identifying an association between the nesting SEI message and its contained SEI messages with the partitioning scheme using the identified partitioning scheme index and identified output layer set index.

14. The method of claim 10, wherein the video data bitstream is associated with a base video parameter set (VPS) and a video usability information (VUI) parameter set, further comprising:
identifying a first portion of the one or more conformance parameters signaled in the base VPS; and
identifying a second portion of the one or more conformance parameters signaled the VUI, wherein the conformance parameters of the second portion are extended such that they are accessible through a data structure associated with the base VPS.

15. The method of claim 14, wherein the one or more conformance parameters mapped to the partition comprises the first portion of conformance parameters and the second portion of conformance parameters accessed through the data structure associated with the base VPS.

16. A video encoder, comprising:
a memory configured to store video data;
a processor in communication with the memory and configured to:
code the video data to form a bitstream having at least one layer and at least one layer set that specifies the at least one layer of the video data bitstream that is to be processed by a video decoder;
associate at least one output layer set with each layer set, wherein the output layer set specifying the at least one layer that is to be output by the video decoder, a first output layer set of the at least one output layer set indicating a subset of its associated layer set that is to be output by the video decoder and a second output layer set of the at least one output layer set indicates another subset of the associated layer set that is to be output by the video decoder;
associate at least one partitioning scheme with the first output layer set and with the second output layer set of the at least one output layer set, the at least one partitioning scheme specifying how the layers of the bitstream of video data are to be partitioned for transmission;
perform a determination as to whether to signal conformance parameters as part of the bitstream, based at least in part on the video encoder and/or one or more encoder configuration settings, wherein the conformance parameters are used to detect a conformance of the bitstream;
in response to a determination to signal conformance parameters as part of the bitstream, map at least one conformance parameter to a partitioning scheme among the at least one partitioning scheme based, at least in part on the first output layer set, and map a second conformance parameter to the partition of the partitioning scheme among the at least one partitioning scheme, based at least in part on the second output layer set.

17. The video encoder of claim 16, wherein the at least one conformance parameter comprises a hypothetical reference decoder (HRD) parameter.

18. The video encoder of claim 16, wherein the processor is further configured to perform a determination as to whether or not to signal a conformance parameter, prior to mapping the at least one conformance parameter to the partition.

19. The video encoder of claim 16, wherein the processor is further configured to, in response to the first output layer set being associated with only one partitioning scheme, signal a bit in the bitstream to indicate that the first output layer set is associated with a default partitioning scheme.

20. The video encoder of claim 19, wherein the default partitioning scheme comprises separating each layer of at least one layer into its own partition.

21. The video encoder of claim 16, wherein the processor is further configured to:
determine a first index of the first output layer set;
determine a second index of the partitioning scheme associated with the first output layer set;
identify a nesting supplemental enhancement information (SEI) message, the nesting SEI message comprising at least one nested SEI message; and
define an association between the at least one nested SEI message and the partitioning scheme based at least in part on the first and second indices.

22. The video encoder of claim 16, wherein the bitstream is associated with a base video parameter set (VPS) and a video usability information (VUI) parameter set, and wherein the processor is further configured to:
determine a first portion of the at least one conformance parameter that is signaled in the base VPS;
identify a second portion of the at least one conformance parameter signaled in the VUI; and
extend the second portion to be accessible via a data structure associated with the base VPS.

23. The video encoder of claim 22, wherein mapping the at least one conformance parameter comprises mapping the first portion and the second portion based on the data structure associated with the base VPS.

24. A video decoder, comprising:
a memory configured to store decoded video data; and
a processor in communication with the memory and configured to:
decode a received a video data bitstream to form the decoded video data, the received video data bitstream having at least one layer and at least one layer set that specifies the at least one layer of the video data bitstream that is to be processed by the video decoder, and the decoding comprising;
identifying a layer set among the at least one layer set of the bitstream, the identified layer set indicating a subset of the at least one layer to be decoded;
determining at least one output layer set associated with the identified layer set, wherein the at least one output layer set specifies the at least one layer that is to be output by the video decoder, a first output layer set of the at least one output layer set indicating a subset of the identified layer set that is to be output by the video decoder and a second output layer set of the at least one output layer set indicating another subset of the identified layer set that is to be output by the video decoder; and
determining at least one partitioning scheme associated with the first output layer set and with the second output layer set of the at least one output layer set, wherein the at least one partitioning scheme specifies how the layers of the video data bitstream are to be partitioned for transmission;

wherein the video data bitstream is received as one or more partitions according to the at least one partitioning scheme associated with the output layer set, wherein conformance parameters used to detect a conformance of the video data bitstream are signaled as part of the video data bitstream, wherein a first conformance parameter is mapped to a partition of the partitioning scheme among the at least one partitioning scheme, based at least in part upon on the first output layer set, and wherein a second conformance parameter is mapped to the partition of the partitioning scheme among the at least one partitioning scheme, based at least in part on the second output layer set.

25. The video decoder of claim 24, wherein the at least one conformance parameter comprises a hypothetical reference decoder (HRD) parameter.

26. The video decoder of claim 24, wherein the processor is further configured to determine that the output layer set is only associated with a default partitioning scheme by checking a bit received in the bitstream indicating that the output layer set is only associated with a default partitioning scheme.

27. The video decoder of claim 24, wherein the processor is further configured to:

identify an index associated with the output layer set;

identify an index associated with the partitioning scheme associated with the output layer set;

identify a nesting supplemental enhancement information (SEI) message, the nesting SEI message comprising one or more contained SEI messages; and identify an association between the nesting SEI message and its contained SEI messages with the partitioning scheme using the identified partitioning scheme index and identified output layer set index.

28. The video decoder of claim 24, wherein the video data bitstream is associated with a base video parameter set (VPS) and a video usability information (VUI) parameter set, and wherein the processor is further configured to:

identify a first portion of the one or more conformance parameters signaled in the base VPS; and identify a second portion of the one or more conformance parameters signaled the VUI, wherein the conformance parameters of the second portion are extended such that they are accessible through a data structure associated with the base VPS.

29. The video decoder of claim 28, wherein the one or more conformance parameters mapped to the partition comprises the first portion of conformance parameters and the second portion of conformance parameters accessed through the data structure associated with the base VPS.

* * * * *